(12) United States Patent
Merrill et al.

(10) Patent No.: US 10,452,734 B1
(45) Date of Patent: Oct. 22, 2019

(54) DATA VISUALIZATION PLATFORM FOR USE IN A NETWORK ENVIRONMENT

(71) Applicant: SSB Legal Technologies, LLC, Los Angeles, CA (US)

(72) Inventors: Richard George Merrill, Pacific Palisades, CA (US); Juan Carlos Moreno, Culver City, CA (US); Jason Madsen, Hollywood, CA (US); Brandon Hinesley, Los Angeles, CA (US); Edgar Alejandro Anzaldua Moreno, Brompton (AU)

(73) Assignee: SSB LEGAL TECHNOLOGIES, LLC, Los Angeles, CA (US)

( * ) Notice: Subject to any disclaimer, the term of this patent is extended or adjusted under 35 U.S.C. 154(b) by 0 days.

(21) Appl. No.: 16/153,643

(22) Filed: Oct. 5, 2018

Related U.S. Application Data

(60) Provisional application No. 62/734,850, filed on Sep. 21, 2018.

(51) Int. Cl.
| | |
|---|---|
| *G06F 16/33* | (2019.01) |
| *G06F 16/00* | (2019.01) |
| *G06F 3/048* | (2013.01) |
| *G06F 16/954* | (2019.01) |
| *G06F 3/0484* | (2013.01) |
| *G06F 16/29* | (2019.01) |
| *G06F 16/9038* | (2019.01) |

(52) U.S. Cl.
CPC ........ *G06F 16/954* (2019.01); *G06F 3/04842* (2013.01); *G06F 16/29* (2019.01); *G06F 16/9038* (2019.01)

(58) Field of Classification Search
CPC ...... G06F 16/29; G06F 16/9038; G06F 3/048; G06F 16/00
See application file for complete search history.

(56) References Cited

U.S. PATENT DOCUMENTS

| | | | |
|---|---|---|---|
| 6,189,002 B1 | 2/2001 | Roitblat | |
| 7,933,859 B1 | 4/2011 | Puzicha et al. | |
| 8,019,650 B2 * | 9/2011 | Donsbach | G06Q 30/06 705/26.1 |

(Continued)

FOREIGN PATENT DOCUMENTS

| | | |
|---|---|---|
| CA | 2841865 | 1/2018 |
| CN | 104008171 | 8/2014 |

(Continued)

OTHER PUBLICATIONS

Aggarwal et al., "On using partial supervision for text categorization", IEEE Transactions on Knowledge and Data Engineering, vol. 16(2):245-255, Feb. 2004.

(Continued)

*Primary Examiner* — Mahelet Shiberou
(74) *Attorney, Agent, or Firm* — Knobbe Martens Olson & Bear LLP

(57) ABSTRACT

Embodiments of systems and methods for analyzing and visualizing data are described. Data from third party data sources can be collected, parsed, and analyzed to generate graphical elements that can help visualize the analyzed data. These graphical elements can be displayed on remote user computing devices to enable users of the system to visualize the analyzed data.

27 Claims, 10 Drawing Sheets

(56) References Cited

U.S. PATENT DOCUMENTS

| | | | |
|---|---|---|---|
| 8,200,642 | B2 | 6/2012 | Maze |
| 8,396,871 | B2 | 3/2013 | Barsony et al. |
| 8,560,378 | B1 | 10/2013 | Kibbe |
| 8,620,842 | B1 | 12/2013 | Cormack |
| 8,661,069 | B1 | 2/2014 | Cox et al. |
| 9,269,053 | B2 | 2/2016 | Naslund et al. |
| 9,467,745 | B1* | 10/2016 | Hotchkiss ............... H04N 21/24 |
| 9,579,397 | B1 | 2/2017 | Towell et al. |
| 9,734,241 | B2 | 8/2017 | Slovak et al. |
| 9,811,518 | B2 | 11/2017 | Leidner et al. |
| 2006/0242190 | A1 | 10/2006 | Wnek |
| 2007/0185835 | A1 | 8/2007 | Ursitti et al. |
| 2009/0150168 | A1 | 6/2009 | Schmidt |
| 2010/0077301 | A1 | 3/2010 | Bodnick |
| 2010/0312725 | A1 | 12/2010 | Privault et al. |
| 2011/0029853 | A1* | 2/2011 | Garrity ................... G06F 11/32 715/215 |
| 2011/0249003 | A1* | 10/2011 | Mercuri ................ G06T 11/206 345/440 |
| 2011/0270881 | A1* | 11/2011 | Borton ................... G06Q 10/06 707/771 |
| 2013/0103677 | A1* | 4/2013 | Chakra ............... G06F 3/04842 707/723 |
| 2014/0244521 | A1 | 8/2014 | Winship et al. |
| 2014/0279583 | A1 | 9/2014 | Surdeanu et al. |
| 2015/0032685 | A1* | 1/2015 | Lingappa ............. G06Q 10/063 707/603 |
| 2015/0142727 | A1* | 5/2015 | Louie ..................... G06F 16/26 707/603 |
| 2015/0254791 | A1 | 9/2015 | Stockton et al. |
| 2016/0140210 | A1 | 5/2016 | Pendyala et al. |
| 2016/0314146 | A1* | 10/2016 | Carothers ............. G06Q 50/18 |
| 2016/0314547 | A1* | 10/2016 | Carothers ............. G06F 16/24 |
| 2016/0314549 | A1 | 10/2016 | Carothers et al. |
| 2017/0212944 | A1* | 7/2017 | Hellman ................ G06Q 10/00 |

FOREIGN PATENT DOCUMENTS

| | | |
|---|---|---|
| JP | 5596213 | 9/2014 |
| JP | 05-627750 | 11/2014 |
| WO | WO 2000/0077690 | 12/2000 |
| WO | WO 2004/061619 | 7/2004 |
| WO | WO 2006/081472 | 8/2006 |
| WO | WO 2008/094552 | 8/2008 |
| WO | WO 2011/099982 | 8/2011 |

OTHER PUBLICATIONS

Barnett et al., "Machine learning classification for document review", in 10 pages.

Dengel, "Making documents work: challenges for document understanding", Proceedings of the Seventh International Conference on Document Analysis and Recognition (ICDAR)(2003).

Losey, "Reinventing the wheel: my discovery of scientific support for 'Hybrid Multimodal' Search", e-Discovery Team, Law and Technology, http://e-discoveryteam.com/2013/04/21/reinventing-the-wheel-my-discovery-of-scientific-support-for-hybrid-multimodal-search/.

Furquim et al., "Clustering and categorization of Brazilian Portuguese legal documents", Proceedings of the 10$^{th}$ International Conference on Computational Processing of the Portuguese Language, pp. 272-283, Apr. 17, 2012.

Roitblat et al., "Document categorization in legal electronic discovery: computer classification vs. manual review", Journal of the American Society for Information Science and Technology banner, First published Dec. 9, 2009, https://doi.org/10.1002/asi.21233.

Tseng et al., "Text mining techniques for patent analysis", Information Processing and Management 43:1216-1247 (2007).

\* cited by examiner

DATA VISUALIZATION PLATFORM FOR USE IN A NETWORK ENVIRONMENT

CROSS-REFERENCE TO RELATED APPLICATIONS

This application claims priority to U.S. Provisional Patent Application No. 62/734,850 filed on Sep. 21, 2018 and titled "DATA VISUALIZATION PLATFORM FOR USE IN A NETWORK ENVIRONMENT." The entire content of the above-referenced application is hereby expressly incorporated herein by reference in its entirety.

LIMITED COPYRIGHT AUTHORIZATION

A portion of the disclosure of this patent document includes material which is subject to copyright protection. The copyright owner has no objection to the facsimile reproduction by anyone of the patent document or the patent disclosure as it appears in the Patent and Trademark Office patent file or records, but otherwise reserves all copyrights whatsoever.

TECHNICAL FIELD

This disclosure relates to the field of data analytics and visualization, and particularly to techniques for facilitating data visualization via remote deices within in a network environment.

SUMMARY OF THE DISCLOSURE

Various embodiments of a platform configured to utilize techniques for visualizing large scale data sets are described herein. The systems, methods, and devices of the disclosure each have several innovative aspects, no single one of which is solely responsible for the desirable attributes disclosed herein.

Embodiments of the present disclosure relate to a data visualization platform for analyzing large scale data sets via remote devices.

In one embodiment; a data visualization platform system is disclosed. The data visualization platform system may include: a data store configured to store analytics data associated with one or more data items; and a data visualization server comprising computer hardware and in communication with the data store. The data visualization server may be configured to: generate instructions to display a user interface (UI) on a remote user computing device, wherein the UI is configured to, when presented on the remote user computing device; include a first UI element for selecting a data item from among a plurality of data items; receive an electronic indication that a first selected data item of the plurality of data items has been selected in the first UI element presented on the remote user computing device, the first data item associated with a first data item category; access, from the data store, first analytics data associated with the first selected data item, the first analytics data indicating a first number of corresponding first category action data items associated to the first selected data item; access, from the data store, second analytics data associated with one or more additional data items of the plurality of data items; but excluding the selected data item, the one or more additional selected data items associated with the first data item category; determine a first feature type, a second feature type, and a date range to be used to generate instructions to present the first analytics data and the second analytics data on the remote user computing device; generate instructions to display a second UI element based on the first analytics data, the second analytics data, and the determined first feature type, second feature type, and date range; and the second UI element including (i) a first visual indicator corresponding to the first number of first category action data items associated with the first selected data item, and (ii) a second visual indicator corresponding to a second number of first category action data items based at least on the second analytics data associated with the one or more additional selected data items, such that the second UI element enables a visual comparison of the first number and the second number on the remote user computing device and renders a visual indication reflecting a weighing of the first category action data items as to the selected data item.

In another embodiment; a system for providing data visualization is disclosed. The system may include: a data store configured to store analytics data associated with one or more judges; and a data visualization server comprising computer hardware and in communication with the data store. The data visualization server may be configured to: generate instructions to display a user interface (UI) on a remote user computing device; wherein the UI is configured to, when presented on the remote user computing device; include a first UI element for selecting a judge from a plurality of judges; receive an indication that a first judge of the plurality of judges has been selected in the first UI element presented on the remote user computing device, the first judge associated with a first geographical region; access, from the data store, first analytics data associated with the first judge, the first analytics data indicating a first number of reassignment motions submitted in cases assigned to the first judge; access, from the data store, second analytics data associated with one or more additional judges of the plurality of judges, the one or more additional judges associated with the first geographical region; determine a case type, a party type; and a date range to be used to present the first analytics data and the second analytics data on the remote user computing device; generate a second UI element based on the first analytics data, the second analytics data, and the determined case type, party type, and date range; and cause the second UI element to be presented on the user computing device, the second UI element including (i) a first visual indicator corresponding to the first number of reassignment motions submitted in the cases assigned to the first judge in the first geographical region and (ii) a second visual indicator corresponding to a second number of reassignment motions based at least on the second analytics data associated with the one or more additional judges in the first geographical region, such that the second UI element enables a visual comparison of the first number and the second number is enabled on the remote user computing device and renders a desirability of submitting a reassignment motion in a specific case assigned to the first judge immediately apparent to a user at the remote user computing device.

In a further embodiment, a data visualization method is disclosed. The data visualization method, as implemented by one or more computing devices configured with specific executable instructions, may include: receiving a request to generate a first user interface (UI) element for a first judge associated with a first geographical region; accessing, from a data store, first analytics data associated with the first judge, the analytics data indicating a number of reassignment motions submitted in cases assigned to the first judge; accessing, from the data store, second analytics data associated with one or more additional judges other than the first judge, the one or more additional judges associated with the first geographical region; determining one or more filters to be used to generate the first UI element for the first judge; generating the first UI element based on the first analytics data, the second analytics data, and the one or more determined filters; and causing the first UI element to be presented on a remote user computing device, the first UI element including (i) a first visual indicator corresponding to the number of reassignment motions submitted in the cases assigned to the first judge in the first geographical region and (ii) a second visual indicator corresponding to a second number of reassignment motions based at least on the second analytics data associated with the one or more additional judges in the first geographical region.

In a further embodiment, non-transitory physical computer storage is disclosed. The non-transitory physical computer storage may store computer executable instructions that, when executed by one or more computing devices, configure the one or more computing devices to: receive a request to generate a user interface (UI) element for a first judge associated with a first geographical region; access, from a data store, first analytics data associated with the first judge, the analytics data indicating a number of reassignment motions submitted in cases assigned to the first judge; access, from the data store, second analytics data associated with one or more additional judges other than the first judge, the one or more additional judges associated with the first geographical region; determine one or more filters to be used to generate the UI element for the first judge; generate the UI element based on the first analytics data, the second analytics data, and the one or more determined filters; and cause the UI element to be presented on a remote user computing device, the UI element including (i) a first visual indicator corresponding to the number of reassignment motions submitted in the cases assigned to the first judge in the first geographical region and (ii) a second visual indicator corresponding to a second number of reassignment motions based at least on the second analytics data associated with the one or more additional judges in the first geographical region.

BRIEF DESCRIPTION OF THE DRAWINGS

The above-mentioned aspects, as well as other features, aspects, and advantages of the present technology will now be described in connection with various aspects, with reference to the accompanying drawings. The illustrated aspects, however, are merely examples and are not intended to be limiting. Throughout the drawings, similar symbols typically identify similar components, unless context dictates otherwise. The following drawings and the associated descriptions are provided to illustrate embodiments of the present disclosure and do not limit the scope of the disclosure. Moreover, the relative dimensions of the following figures may not be drawn to scale. Further, reference numbers are re-used to indicate correspondence between referenced elements. The drawings are provided to illustrate embodiments of the subject matter described herein and not to limit the scope thereof.

DETAILED DESCRIPTION OF EXAMPLE EMBODIMENTS

Figure 1:
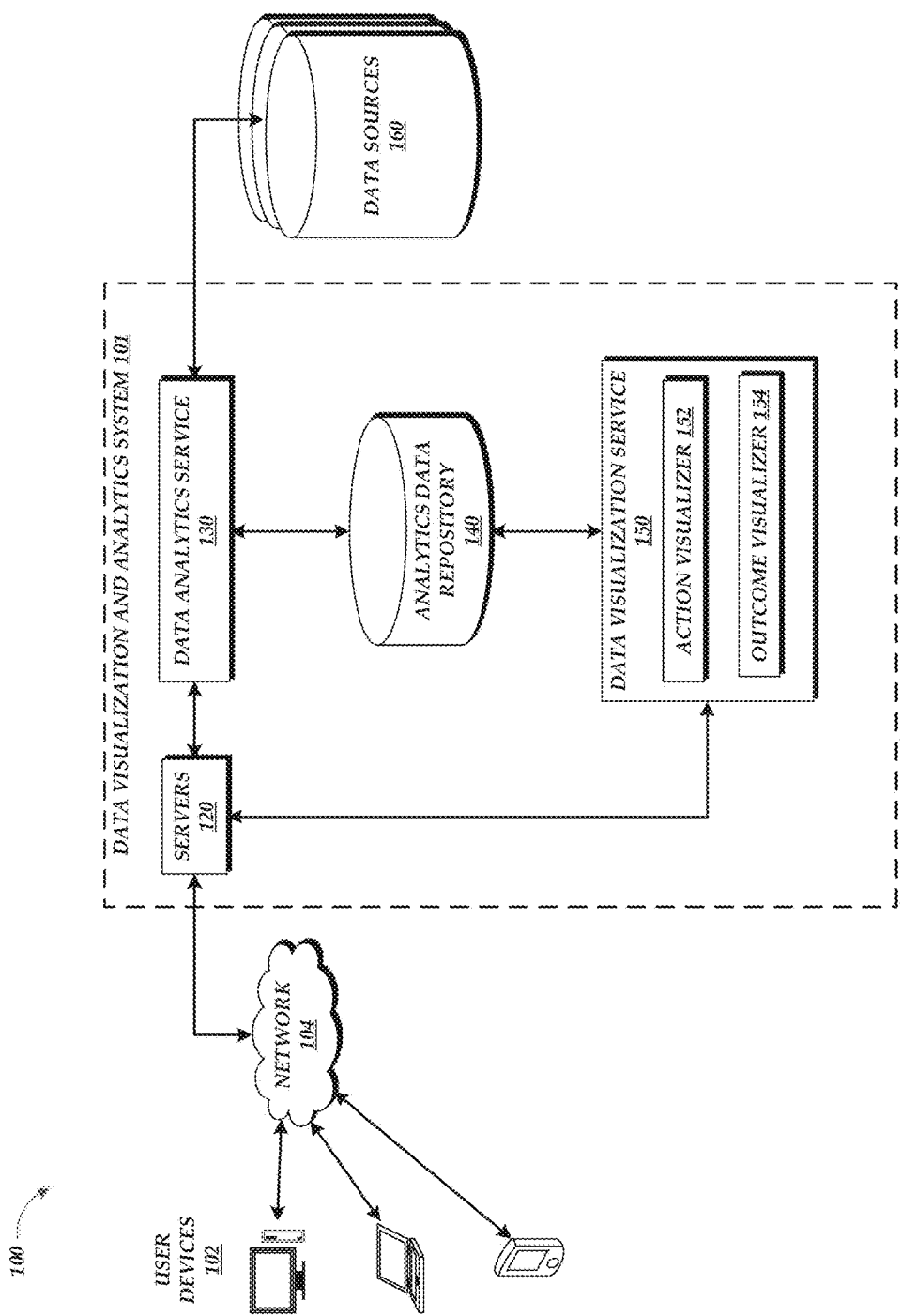
FIG. 1 is an embodiment of a block diagram depicting an illustrative network environment for analyzing and visualizing data in accordance with aspects of the present disclosure.

Although certain embodiments and examples are disclosed below, subject matter extends beyond the specifically disclosed embodiments to other alternative embodiments and/or uses and to modifications and equivalents thereof. Thus, the scope of the application is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Overview

Embodiments of the present disclosure relate to a data visualization platform for providing tools for remote user devices to visualize, filter, and conduct analytics of aggregated, large scale data sets. The data visualization platform may be configured to respond to requests from the remote user devices in real-time. The data visualization platform may include pre-compilation modules for selecting subsets of the generated analytics to be pre-complied on a scheduled basis in order to improve or reduce the latency when responding to real-time requests. The aggregation of the large scale data sets may also assist with improving accuracy levels which can also decline when datasets are used at too granular a level or when related data items from different sources conflict or do not match. The data visualization platform may also generate encrypted data packets in response to the real-time requests which can provide instructions to remote user devices for rendering secure visualization interfaces and data feeds based on the analyzed data. A benefit of some embodiments is that the data visualization platform presents the analyzed and filtered data in an easily digestible graphic representation, thus allowing the user, a human operator who is not capable of reviewing or processing such large scale data sets to quickly understand specific actions and outcomes related to the large scale data sets.

Embodiments of the disclosure will now be described with reference to the accompanying figures. The terminology used in the description presented herein is not intended to be interpreted in any limited or restrictive manner, simply because it is being utilized in conjunction with a detailed description of certain specific embodiments of the disclosure.

Example Network Environment

The illustrative network environment 100 shown in FIG. 1 includes a data visualization and analytics system 101 according to one embodiment. The data visualization and analytics system 101 enables a user to access analytics data generated based on various electronic data sets and documents and visualizations of such analytics data. The user may select a specific data item from a set of data items, and the data visualization and analytics system 101 may present visual elements to the user that indicate one or more performance statistics of the selected data item. Additionally, the data visualization and analytics system 101 may present to the user a visual indication of the distribution of analyzed data. Further, the data visualization and analytics system 101 may present to the user a visual comparison of performance data of two or more items.

For example, in one example use case, a system can collect data from judicial data sources (such as, for example, court dockets, rulings, briefs, and so forth), parse and analyze the collected data, and generate graphical elements that can help visualize the analyzed data. The system can then cause these graphical elements to be displayed on remote user computing devices to enable users of the system to visualize the analyzed data. For example, the system may receive a selection from a user of a specific judge from a list of judges, and the system may present visual elements to the user that indicate one or more performance statistics of the selected judge such as the number of reassignment motions filed against the judge. The system may generate analytics data indicating the number of times a reassignment motion (for example, a request for a new judge without having to provide a reason for cause or a request for a new judge based on cause, such as because of disqualification) has been filed against a specific judge based on data collected from court records. Based on the analytics data, the system may cause a graphical element to be displayed on the display screen of a remote user computing device. The displayed graphical element may visually indicate the frequency at which the reassignment motion is filed against the specific judge relative to other judges in the same county. In addition, the displayed graphical element may include a distribution of other judges to which the case is transferred subsequent to the reassignment motion being filed against the specific judge and/or a visual comparison of performance statistics of the specific judge as compared with one or more other judges (for example, the selected judge against one or more other judges in the same county or jurisdiction), rendering the desirability of filing the reassignment motion in a given case assigned to the specific judge immediately apparent to the user of the remote user computing device. Although embodiments of an example of use case are described in the context of judicial data analytics, the techniques of the present disclosure can be applied to another field or purpose, such as, for example, medical provider data analytics, educator data analytics, and so forth.

By way of illustration, various example user devices 102 are shown in communication with the data visualization and analytics system 101 via network 104. The user devices 102 can be any computing device such as a desktop, a laptop, a mobile phone (or smartphone), a tablet, a kiosk, a television, a wristwatch (including a smartwatch), a wireless device, a media player, one or more processor devices, integrated circuit components for inclusion in computing devices, and the like.

The network 104 over which the user devices 102 can access the data visualization and analytics system 101 may be any wired network, wireless network, or combination thereof. In addition, the network 104 may be a personal area network, local area network, wide area network, over-the-air broadcast network (for radio or television, for example), cable network, satellite network, cellular telephone network, or combination thereof. For example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks.

In the depicted embodiment, the data visualization and analytics system 101 includes servers 120, which can communicate with the user devices 102 over the network 104 and provide access to various services of the data visualization and analytics system 101. In the example of FIG. 1, the services provided by the data visualization and analytics system 101 include a data analytics service 130 and a data visualization service 150. In some embodiments, these services can be implemented as software components executing in physical computer hardware on the servers 120 or in separate computing devices.

The data analytics service 130 can access data sources 160 and collect data. Using the example use case, the data may relate to various courts, cases, judges, dockets, parties, rulings, briefs, and so forth and store the data in an analytics data repository 140.

The data sources 160 can include state court databases, federal court databases, and the like. One or more of such databases may include state court dockets, federal district court dockets, state and/or federal appellate court dockets, administrative court dockets, and filings and/or decisions therein. In some cases, the databases may include legislative materials, codes, and findings, and/or administrative materials, regulations, guidance, findings, and the like. The data sources 160 may provide application programming interfaces (APIs) that may be called by the data analytics service 130 to access the data stored thereon. In other embodiments, the data sources 160 may allow data to be downloaded as a file or may provide electronic pages for screen capturing. The data analytics service 130 may store the data accessed from the data sources 160 in the analytics data repository 140. In some embodiments, the data analytics service 130 may parse and analyze the data before storing the data in the analytics data repository 140 as analytics data. The data analytics service 130 may periodically access a predefined set of third party systems or other data sources to collect additional data and to update the analytics data repository 140 based on any additional data. Some or all of the data described herein can be stored in a database format (SQL, for example). In some embodiments, at least some of the data described herein is stored in a blockchain format (as a blockchain ledger, for example).

The data visualization service 150 may implement a data visualization method by which visualizations of data collected from the data sources 160 and/or data stored in the analytics data repository 140 are generated and presented on the user devices 102. The visualizations may include a plurality of UI elements and/or visual indicators that render the latent information included in the data more immediately apparent to the users on the user devices 102.

In the example of FIG. 1, the data visualization service 150 includes an action visualizer 152 and an outcome visualizer 154 that may be used to implement various aspects of the present disclosure, such as providing a visual indication of the number of actions associated with a selected data item, providing a visual indication of outcomes of such actions, and providing a visual comparison of one or more performance metrics of the selected data item as compared with other data items within the same category or set. Using the example use case, the visual indication may show the number of actions associated with a selected judge (for example, reassignment motions filed against the given judge), as well as the outcomes of such actions (for example, distribution of cases transferred to other respective judges after being initially assigned to the given judge). A visual comparison of one or more performance metrics of the given judge against one or more other judges in the county or jurisdiction may also be provided. Although illustrated as a separate component of the data visualization service 150, in some embodiments, the action visualizer 152 and the outcome visualizer 154 may be a single component of the data visualization service 150.

The action visualizer 152 can access data in the analytics data repository 140 and provide a visualization of the actions taken with respect to a particular selected data item. The visualization may include a comparison of a visual indicator corresponding to the selected data item and another visual indicator corresponding to one or more other data item within the same category or set. Using the example use case, the actions could include case reassignment requests filed under California Code of Civil Procedure Section 170.6 (CCP § 170.6 filing) with respect to a particular judge. The visualization may include a side-by-side comparison of a visual indicator corresponding to the particular judge and another visual indicator corresponding to at least one or more other judges (for example, individual metrics associated with other judges, or aggregate metrics such as an average number of actions taken in a jurisdiction associated with the particular judge). Examples of the visualization provided by the action visualizer 152 under the example use case are described in greater detail below with reference to FIGS. 4 and 5.

The outcome visualizer 154 can access data in the analytics data repository 140 and provide a visualization of the outcomes of the actions. Using the example use case, the outcomes could be the reassignment after CCP § 170.6 motions filed with respect to a particular judge. The visualization may include a distribution of visual indicators that are each indicative of the percentage of cases re-assigned to one of the other judges in the jurisdiction associated with the particular judge as a result of a CCP § 170.6 motion being filed against the particular judge. Examples of the visualization provided by the outcome visualizer 154 under the example use case are described in greater detail below with reference to FIG. 7.

The data visualization and analytics system 101 is depicted in FIG. 1 as operating in a distributed computing environment including several computer systems that are interconnected using one or more computer networks. The data visualization and analytics system 101 could also operate within a computing environment having a fewer or greater number of devices than are illustrated in FIG. 1. Thus, the depiction of data visualization and analytics system 101 in FIG. 1 should be taken as illustrative and not limiting to the present disclosure. For example, the data visualization and analytics system 101 or various constituents thereof could implement various Web services components, hosted or "cloud" computing environments, and/or peer-to-peer network configurations to implement at least a portion of the processes described herein.

Further, the data visualization and analytics system 101 may be implemented in hardware and/or software and may, for example, include one or more physical or virtual servers implemented on physical computer hardware configured to execute computer executable instructions for implementing the various features described herein. The one or more servers may be geographically dispersed or geographically co-located, for example, in one or more data centers.

Moreover, the processing of the various components or services of the data visualization and analytics system 101 can be distributed across multiple machines, networks, or other computing resources. The various components or services of the data visualization and analytics system 101 can also be implemented in one or more virtual machines or hosted computing environment (for example, "cloud") resources, rather than in dedicated servers. Likewise, the data repositories shown can represent local and/or remote, physical and/or logical data storage, including, for example, storage area networks or other distributed storage systems. In some embodiments, the connections between the components or services shown represent possible paths of data flow, rather than actual connections between hardware. Executable code modules that implement various functionalities of the data visualization and analytics system 101 can be stored in the memories of the servers 120 and/or on other types of non-transitory computer-readable storage media. While some examples of possible connections are shown, any subset of the components shown can communicate with any other subset of components in various implementations.

Example Data Operations of Data Visualization Service

Figure 2:
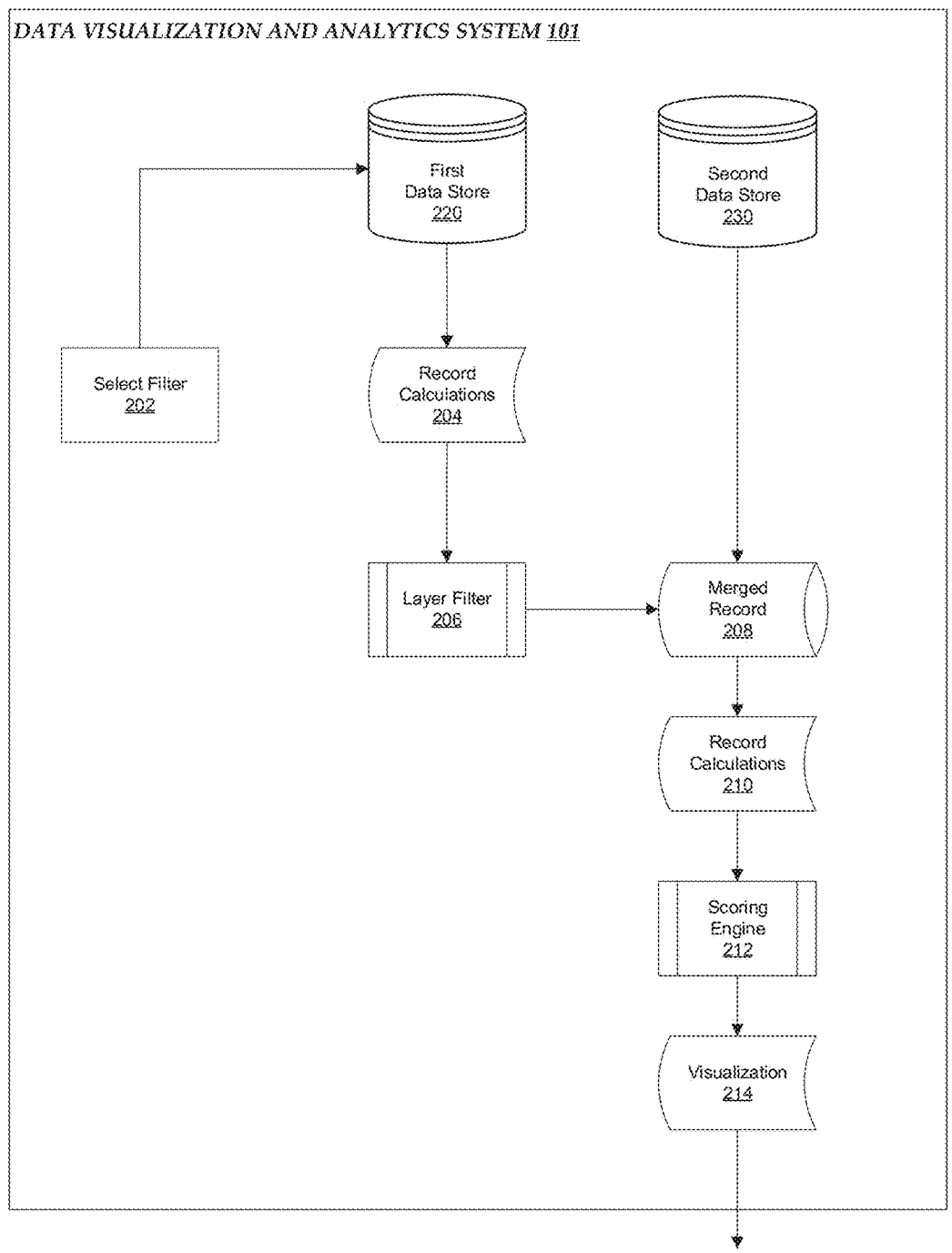
FIG. 2 is an embodiment of a block or data flow diagram of a database system for providing data visualizations in accordance with aspects of the present disclosure.

FIG. 2 is one embodiment of a block or data flow diagram of the data visualization service 150, for generating visualizations of the data collected from the data sources 160 and/or data stored in the analytics data repository 140. In some implementations, one or more of the blocks of FIG. 2 may be optional, and/or blocks may be rearranged. Although FIG. 2 is described using the example use case of providing visualization on reassignment motions, the described techniques can be applied to another field or purpose, such as, for example, medical provider data analytics, educator data analytics, and so forth.

At block 202, the data visualization service 150 accesses a select filter to select a judge from a plurality of judges. Based on the judge selected from the plurality of judges, the data visualization service 150 accesses the data store 220 to retrieve analytics data associated with the selected judge.

At block 204, the data visualization service 150 performs and records various calculations based on the data retrieved from the first data store 220. For example, the data visualization service 150 may calculate one or more performance metrics associated with the selected judge. In some cases, such calculations are performed prior to receiving a request to generate a data visualization for a judge.

At block 206, the data visualization service 150 may layer one or more filters to tailor the visualization to satisfy the particular needs of the users. For example, if the user has indicated that the user is interested in viewing a visualization based on motions filed by plaintiffs in personal injury cases, the data visualization service 150 may apply the party type filter (with a value corresponding to "plaintiff") and the case type filter (with a value corresponding to "personal injury") to the data to be used to generate the visualization requested by the user.

At block 208, the data visualization service 150 merges the filtered data with data retrieved from second data store 230. For example, the second data store 230 may include analytics data associated with judges other than the selected judge. In some cases, the second data store 230 includes types of data other than those stored in the first data store 220. For example, the first data store may include court docket data, and the second data store 230 may include ruling or brief data that can be used to improve or substantiate the analytics data derived from the court docket data.

At block 210, the data visualization service 150 performs and records additional calculations. For example, the data visualization service 150 may compare and generate comparative metrics that can be included in the visualization such as the percentage values in FIG. 7 and/or the performance metrics shown in FIG. 9.

At block 212, the data visualization service 150 determines scores to be included in the visualization. For example, the data visualization service 150 may calculate a score indicative of how plaintiff-friendly or defendant-friendly a particular judge is. As another example, the data visualization service 150 may calculate an action score indicative of the desirability of taking a particular action (for example, filing a COP § 170.6 motion) with respect to the selected judge (for example, based on user-specified parameters such as party, case type, and so forth). The action score may comprise a binary visual indicator that indicates whether or not the user would benefit from taking the particular action. Alternatively, the action score may comprise a visual indicator (for example, dial, slider bar, and so forth) indicative of the degree of desirability of taking the particular action. At block 214, the data visualization service 150 generates instructions to display the visualization on the user device.

Action Data Visualization Method

Figure 3:
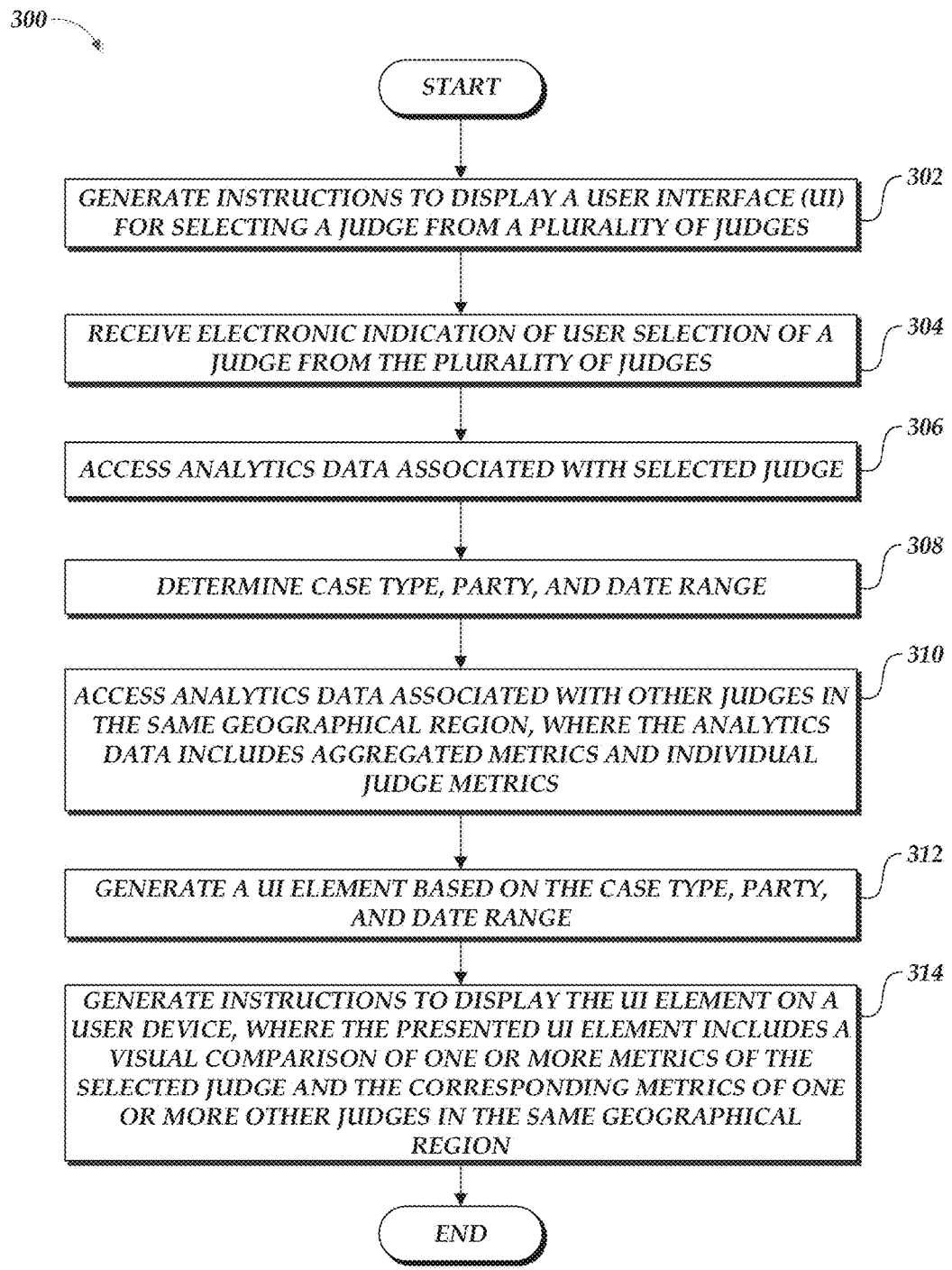
FIG. 3 is an embodiment of a flow diagram illustrating an example method for providing a visual indication of the number of reassignment motions filed against a judge in accordance with aspects of the present disclosure.

FIG. 3 is an embodiment of a flow diagram of an illustrative method 300 implemented in whole or in part by the data visualization service 150 for retrieving analytics data and generating visual indicators for presentation on a user device. While the illustrative method will be described below as being implemented by one or more components of the data visualization and analytics system 101 (for example, data visualization service 150), in other embodiments, one or more of the illustrated steps may be implemented by a component of the data visualization and analytics system 101 not shown in FIG. 1 or another computing system not shown in FIG. 1. For convenience, the steps of the example method 500 are described as being performed by the action visualizer 152. Although FIG. 3 is described using the example use case of providing visualization on reassignment motions, the described techniques can be applied to another field or purpose, such as, for example, medical provider data analytics, educator data analytics, and so forth.

At block 302, the action visualizer 152 generates, displays, renders, or sends instructions to display a user interface (UI) for selecting a judge from a plurality of judges. For example, the UI may include an array of UI elements that each correspond to a judge in a particular jurisdiction (for example, county, region, district, city, state, and the like).

Next, at block 304, the action visualizer 152 receives an electronic indication that corresponds to a user selection of a judge from the plurality of judges. For example, upon user activation of one of such UI elements included in the UI presented on a remote user computing device, the action visualizer 152 receives an indication that the user has selected the judge corresponding to the UI element activated by the user.

At block 306, the action visualizer 152 accesses analytics data associated with the selected judge. For example, the action visualizer 152 may access the analytics data repository 140 that includes analytics data previously generated by the data analytics service 130. Such analytics data associated with the selected judge may include various performance metrics such as the likelihood that the selected judge will grant or deny a particular type of motion, the frequency of a particular action being taken with respect to the user (for example, a reassignment motion being filed against the selected judge).

At block 308, the action visualizer 152 determines the case type, party, and/or date range to be used to generate the UI element for display to the user. For example, the action visualizer 152 may determine one or more of the case type, party, and/or date range based on default or initial values. As another example, the action visualizer 152 may determine one or more of the case type, party, and/or date range based on user-inputted values (for example, via a selection UI such as a drop-down menu).

At block 310, the action visualizer 152 accesses analytics data associated with other judges in at least one same category as the selected judge (such as, for example, the same geographical region as the selected judge), where the analytics data includes aggregated metrics and individual judge metrics. For example, the aggregated metrics may include an average number of reassignment motions filed against a judge in a given county or region, and the individual judge metrics may include the number of reassignment motions filed against the respective judges in the county or region.

At block 312, the action visualizer 152 generates a UI element based on the case type, party, and/or date range. For example, the action visualizer 152 may apply one or more filters on the analytics data based on the determined case type, party, and/or date range, and generate the UI element based on the filtered data.

At block 314, the action visualizer 152 generates, displays, renders, or sends instructions to display the UI element on the user device, where the presented UI element includes a visual comparison of one or more metrics of the selected judge and the corresponding metrics of one or more other judges in the same geographical region. For example, the UI element may include a visual indicator indicative of the frequency of a particular action being taken with respect to the judge (for example, a reassignment motion being filed against the selected judge), and another visual indicator indicative of the frequency of the particular action being taken with respect to other judges (including or not including the selected judge) such that the UI element renders the popularity or desirability of taking the particular action immediately apparent to the user viewing the UI element.

While FIG. 3 has been described above with reference to an embodiment in which the action visualizer 152 generates instructions to display a UI for user selection of a judge, receives the electronic indication that corresponds to the user selection of a judge, accesses analytics data associated with the selected judge, determines the case type, party, and/or date range, accesses analytics data associated with other judges, and/or generates instructions to display a UI element, in other embodiments, all or a portion of the method 300 may be performed by one of user devices 102 or another computing device not shown in FIG. 1. For example, executable code for performing one or more of generating instructions to display a UI for user selection of a judge, receiving the electronic indication that corresponds to the user selection of a judge, accessing analytics data associated with the selected judge, determining the case type, party, and/or date range, accessing analytics data associated with other judges, and/or generating instructions to display a UI element may be provided to a remote user computing device, which can execute the executable code to perform one or more of the steps of the method 300. Thus, in some embodiments, the data visualization process is performed entirely outside the data visualization and analytics system 101. In other embodiments, the data visualization process is performed partially by the data visualization and analytics system 101 and partially by one or more other computing systems. In some embodiments, one or more of the steps described with reference to FIG. 3 are performed using a Software-as-a-Service (SaaS) platform.

Example User Interfaces Including Action Data Visual Indicators

Figure 4:
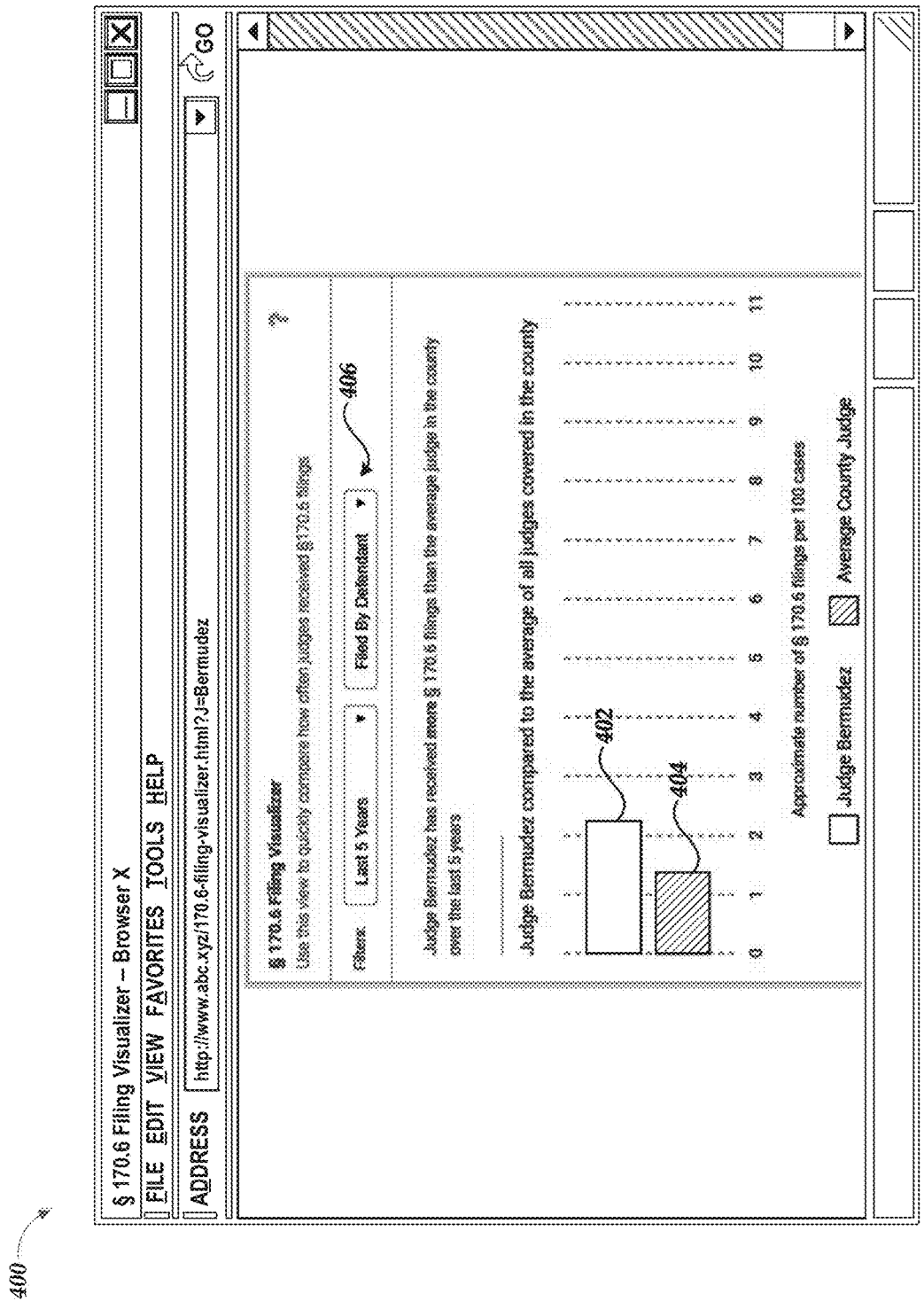
FIG. 4 is an embodiment of an example graphical user interface providing a visual indication of the number of reassignment motions filed against a judge in accordance with aspects of the present disclosure.

FIG. 4 illustrates an embodiment of a user interface (UI) 400 displaying visual indicators for visualizing action data associated with a judge. The UI 400 includes UI elements 402-406. For example, the UI 400 includes a visual indicator 402 representative of the number of CCP § 170.6 filings received by Judge Bermudez, a visual indicator 404 representative of the average number of CCP § 170.6 filings received by judges in the same county, and filters 406 for adjusting the date range (for example, last 5 years, last 7 years, last 10 years, and so forth) and party (for example, filed by the defendant, filed by the plaintiff, filed by either party). Although not shown in FIG. 4, the filters 406 may further include a case type filter (for example, check boxes for selecting all case types, business torts, class actions, employment, real property, personal injury, and/or the like) for specifying one or more case types to be reflected in the generation of the visual indicators 402 and 404.

As shown in FIG. 4, the UI 400 renders the desirability and/or popularity of filing a CCP § 170.6 motion against a given judge immediately apparent to the user viewing the UI 400 based on the visual comparison between the visual indicator corresponding to the number of such filings received by the judge, and the visual indicator corresponding to the average number of such filings. Further, some or all of the combinations of filter values can be pre-processed or pre-compiled and stored in the analytics data repository 140 such that the latency associated with applying a specific combination of filter values and generating UI elements based on the specific combination of filter values is reduced. For example, such pre-processing can occur between a time when the relevant data is collected from the data sources 160 and a time when a request to generate the UI elements is received from a remote user computing device. In some other cases, such pre-processing is not performed, and the data processing occurs after the request to generate the UI elements is received from the remote user computing device.

Figure 5:
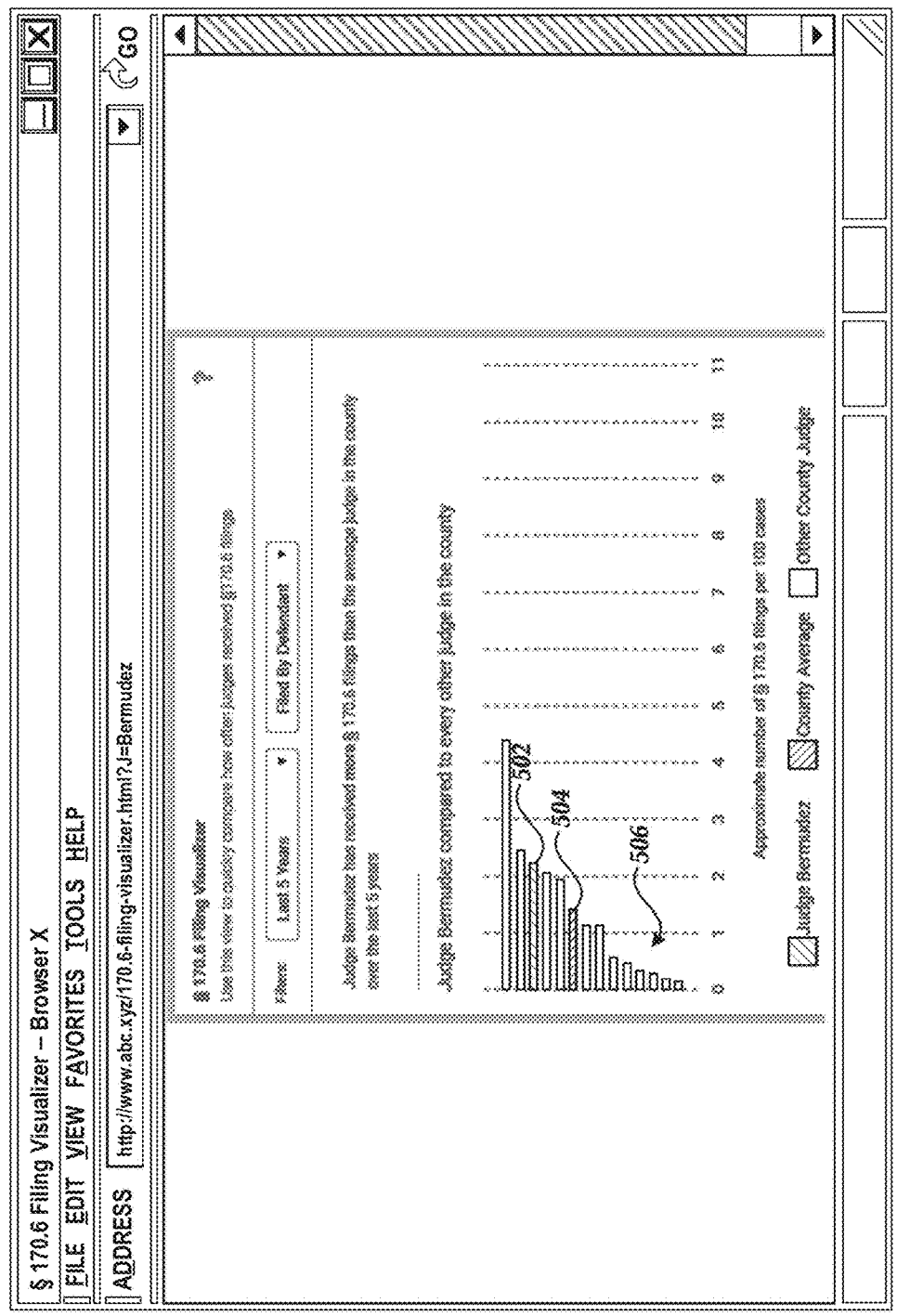
FIG. 5 is an embodiment of another example graphical user interface providing a visual indication of the number of reassignment motions filed against a judge in accordance with aspects of the present disclosure.

FIG. 5 illustrates another an embodiment of an UI 500 displaying visual indicators for visualizing action data associated with a judge. The UI 500 includes UI elements 502-506. For example, the UI 500 includes a visual indicator 502 representative of the number of CCP § 170.6 filings received by Judge Bermudez, a visual indicator 504 representative of the average number of CCP § 170.6 filings received by judges in the same county, and visual indicators 506 that each correspond to a respective judge in the same county (for example, individual judges other than Judge Bermudez).

As shown in FIG. 5, the UI 500 renders the desirability and/or popularity of filing a CCP § 170.6 motion against a given judge immediately apparent to the user viewing the UI 500 based on the relative positions of the visual indicator corresponding to the number of such filings received by the judge, the visual indicator corresponding to the average number of such filings, and the visual indicators corresponding to the other judges in the same jurisdiction. While the embodiments of the UIs of FIGS. 4 and 5 are shown with a browser, it is recognized that the UIs could be displayed within other environments, for example, a mobile application or a stand-alone program.

Outcome Data Visualization Method

Figure 6:
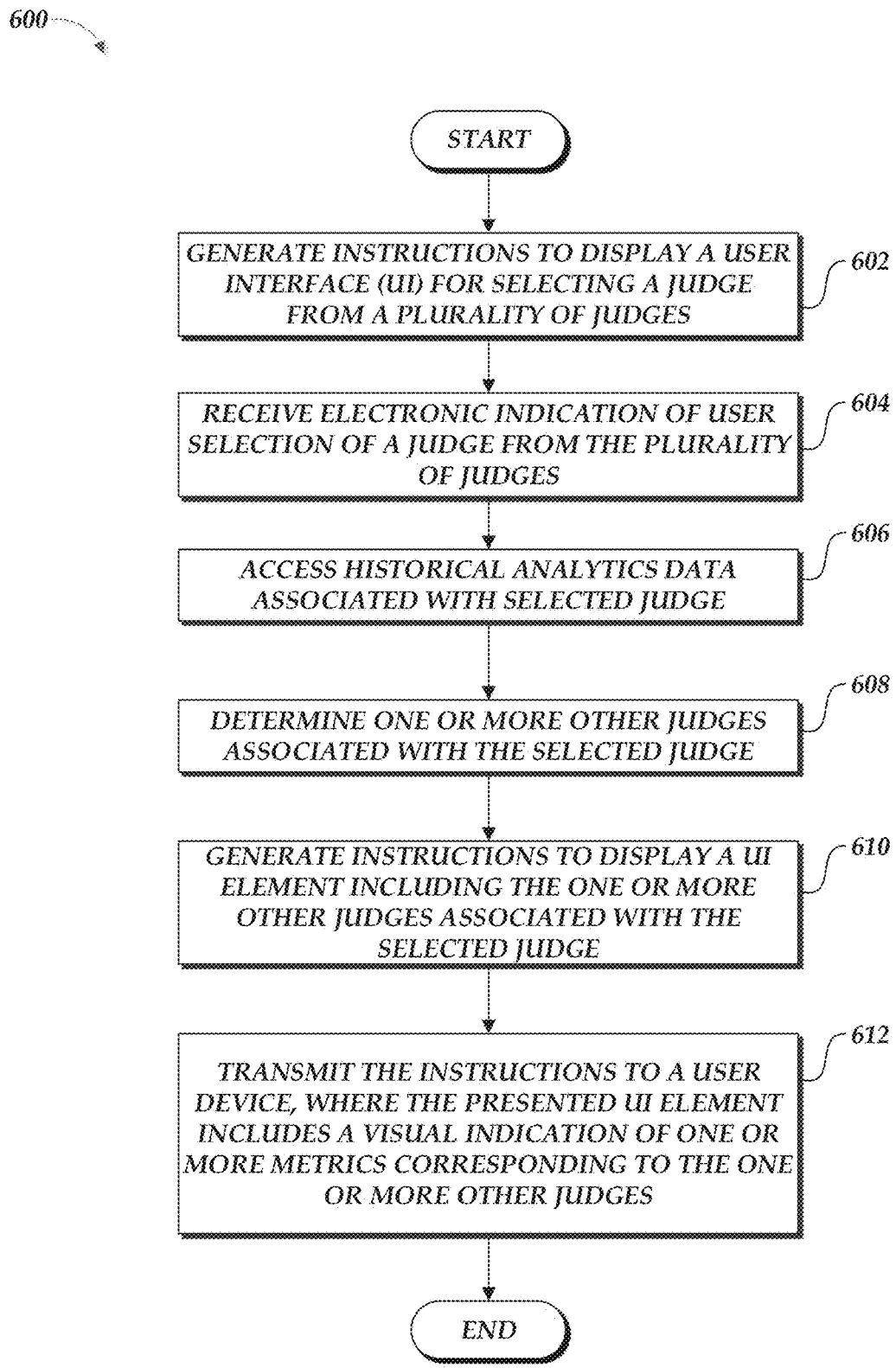
FIG. 6 is an embodiment of a flow diagram illustrating an example method for providing a list of other judges in accordance with aspects of the present disclosure.

FIG. 6 is an embodiment of a flow diagram of an illustrative method 600 implemented in whole or in part by the data visualization service 150 for retrieving analytics data and generating visual indicators for presentation on a user device. While the illustrative method will be described below as being implemented by one or more components of the data visualization and analytics system 101 (for example, data visualization service 150), in other embodiments, one or more of the illustrated steps may be implemented by a component of the data visualization and analytics system 101 not shown in FIG. 1 or another computing system not shown in FIG. 1. For convenience, the steps of the example method 500 are described as being performed by the outcome visualizer 154. Although FIG. 6 is described using the example use case of providing visualization on reassignment motions, the described techniques can be applied to another field or purpose, such as, for example, medical provider data analytics, educator data analytics, and so forth.

At block 602, the outcome visualizer 154 generates instructions to display a user interface (UI) for selecting a judge from a plurality of judges. For example, the UI may include an array of UI elements that each correspond to a judge in a particular jurisdiction (for example, county, region, district, city, state, and the like).

Next, at block 604, the outcome visualizer 154 receives an electronic indication that corresponds to a user selection of a judge from the plurality of judges. For example, upon user activation of one of such UI elements included in the UI presented on a remote user computing device, the outcome visualizer 154 receives an indication that the user has selected the judge corresponding to the UI element activated by the user.

At block 606, the outcome visualizer 154 accesses historical analytics data associated with the selected judge. The historical analytics data may be stored in the analytics data repository 140 and indicate the historical outcomes of a particular action taken with respect to the selected judge. For example, the historical analytics data may indicate the names of (or identifiers associated with) the judges to whom the cases that were initially assigned to the selected judge were re-assigned in response to CCP § 170.6 filings.

At block 608, the outcome visualizer 154 determines one or more other judges associated with the selected judge. The outcome visualizer 154 may identify some or all of the judges to whom the cases initially assigned to the selected judge have been transferred in response to CCP § 170.6 filings. For example, the outcome visualizer 154 may identify the top 3 judges to whom the highest number of cases have been re-assigned in response to CCP § 170.6 filings against the selected judge.

At block 610, the outcome visualizer 154 generates instructions to display a UI element including the one or more other judges associated with the selected judge. For example, the outcome visualizer 154 may generate a visual indicator for each of the one or more other judges, where the visual indicator is indicative of the number (or percentage) of cases re-assigned from the selected judge in response to CCP § 170.6 filings.

At block 612, the outcome visualizer 154 transmits the instructions to display the UI element to a user device, where the presented UI element includes a visual indication of one or more metrics corresponding to the one or more other judges. For example, the one or more metrics may include the percentage of cases transferred or re-assigned to a given judge among the total number of cases assigned away from the selected judge in response to CCP § 170.6 filings.

While FIG. 6 has been described above with reference to an embodiment in which the outcome visualizer 154 generates instructions to display a UI for user selection of a judge, receives the electronic indication that corresponds to the user selection of a judge, accesses historical analytics data associated with the selected judge, determines other judges associated with the selected judge, and/or generates instructions to display a UI element including the other judges, in other embodiments, all or a portion of the method 600 may be performed by one of user devices 102 or another computing device not shown in FIG. 1. For example, executable code for performing one or more of generating instructions to display a UI for user selection of a judge, receiving the electronic indication that corresponds to the user selection of a judge, accessing historical analytics data associated with the selected judge, determining other judges associated with the selected judge, and/or generating instructions to display a UI element including the other judges may be provided to a remote user computing device, which can execute the executable code to perform one or more of the steps of the method 600. Thus, in some embodiments, the data visualization process is performed entirely outside the data visualization and analytics system 101. In other embodiments, the data visualization process is performed partially by the data visualization and analytics system 101 and partially by one or more other computing systems. In some embodiments, one or more of the steps described with reference to FIG. 6 are performed using a SaaS platform.

Example User Interfaces Including Outcome Data Visual Indicators

Figure 7:
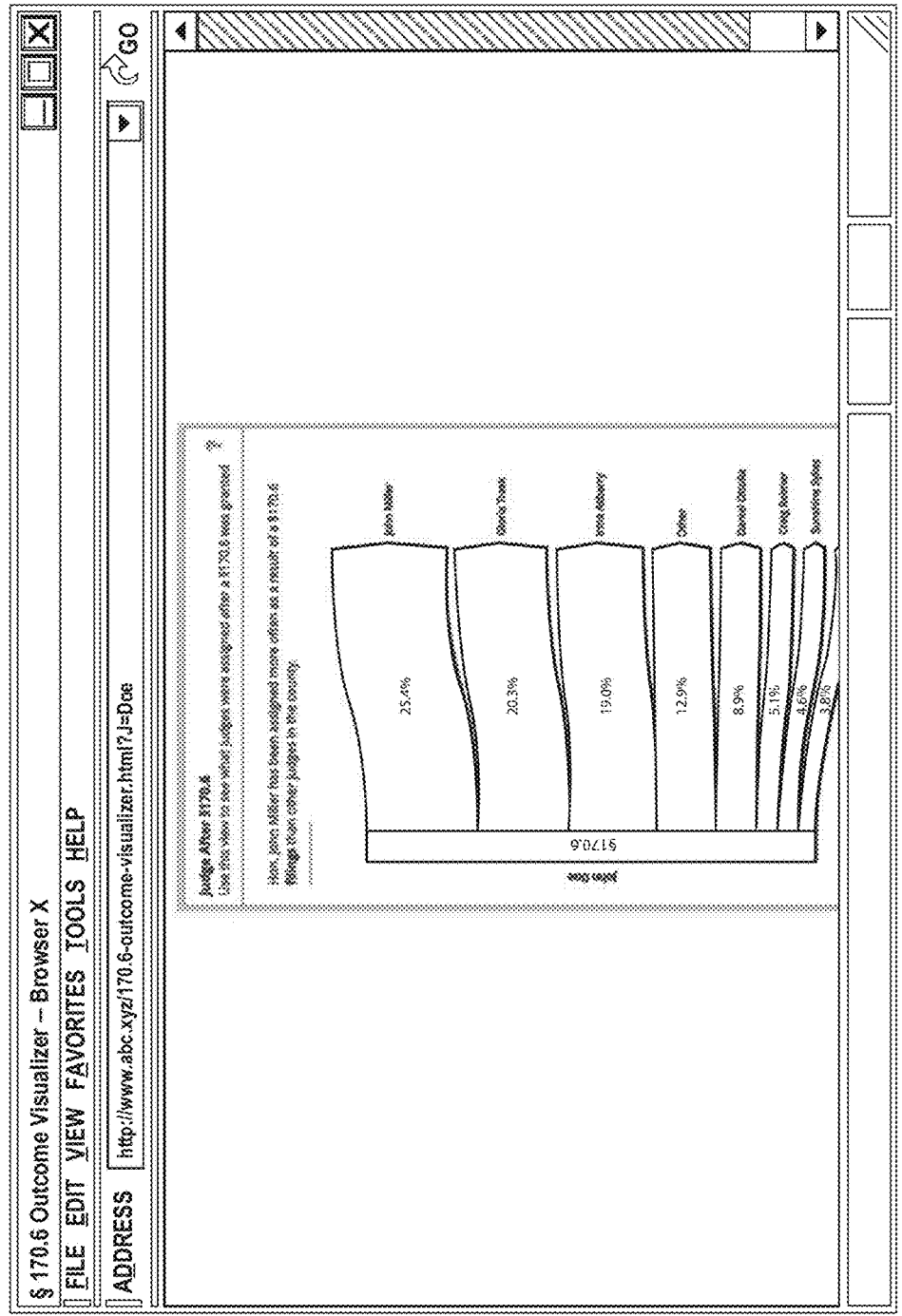
FIG. 7 is an embodiment of an example graphical user interface providing a visual distribution of the cases transferred to other judges in accordance with aspects of the present disclosure.

FIG. 7 illustrates an embodiment of an example user interface (UI) 700 displaying visual indicators for visualizing outcome data associated with a judge. When a given action is taken in a case assigned to the judge (for example, a CCP § 170.6 filing), the outcome of the action may be the case being re-assigned to another judge (for example, in the same county). The UI 700 includes UI elements 702 and 704 for visualizing the outcomes of the actions taken with respect to Judge John Doe. For example, the UI 700 includes a visual indicator 702 representative of the percentage of cases reassigned from Judge John Doe to Judge John Miller in response to a CCP § 170.6 filing, and a visual indicator 704 representative of the percentage of cases reassigned from Judge John Doe to Judge Gloria Trask in response to a CCP § 170.6 filing, among others shown in FIG. 7.

As shown in FIG. 7, the UI 700 renders the likely outcomes of taking a given action with respect to the selected judge immediately apparent to the user viewing the UI 700 based on a visual comparison of the visual indicators included in the UI 700. While the embodiment of the UI of FIG. 7 is shown with a browser, it is recognized that the UI could be displayed within other environments, for example, a mobile application or a stand-alone program.

Comparison Visualization Method

Figure 8:
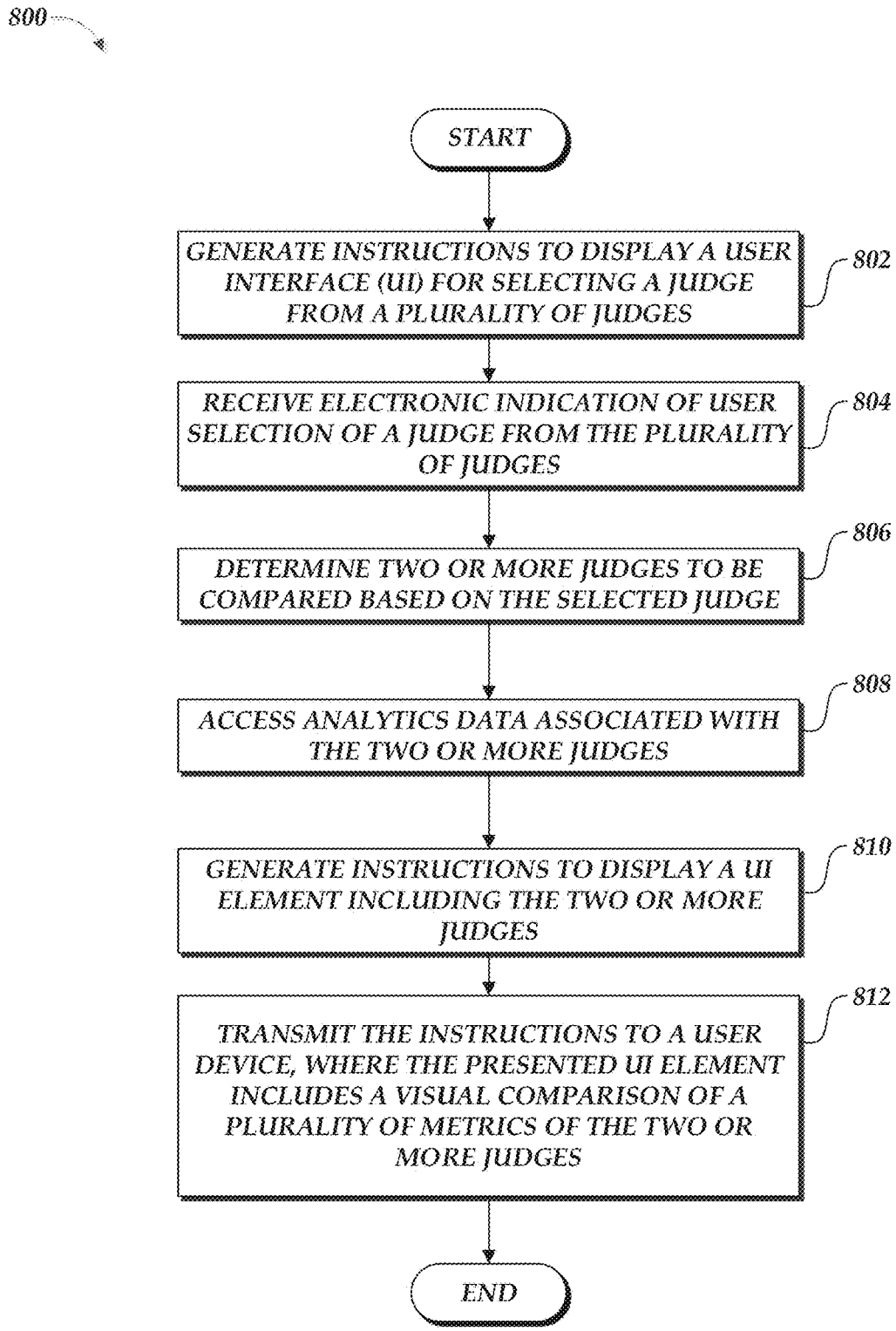
FIG. 8 is an embodiment of a flow diagram illustrating an example method for providing a visual comparison of two or more judges in accordance with aspects of the present disclosure.

FIG. 8 is an embodiment of a flow diagram of an illustrative method 800 implemented in whole or in part by the data visualization service 150 for retrieving analytics data and generating visual indicators for presentation on a user device. While the illustrative method will be described below as being implemented by one or more components of the data visualization and analytics system 101 (for example, data visualization service 150), in other embodiments, one or more of the illustrated steps may be implemented by a component of the data visualization and analytics system 101 not shown in FIG. 1 or another computing system not shown in FIG. 1. For convenience, the steps of the example method 500 are described as being performed by the data visualization service 150. Although FIG. 8 is described using the example use case of providing visualization on reassignment motions, the described techniques can be applied to another field or purpose, such as, for example, medical provider data analytics, educator data analytics, and so forth.

At block 802, the data visualization service 150 generates instructions to display a user interface (UI) for selecting a judge from a plurality of judges. For example, the UI may include an array of UI elements that each correspond to a judge in a particular jurisdiction (for example, county, region, district, city, state, and the like).

Next, at block 804, the data visualization service 150 receives an electronic indication that corresponds to a user selection of a judge from the plurality of judges. For example, upon user activation of one of such UI elements included in the UI presented on a remote user computing device, the data visualization service 150 receives an indication that the user has selected the judge corresponding to the UI element activated by the user.

At block 806, the data visualization service 150 determines two or more judges to be compared based on the selected judge. For example, the two or more judges may include the selected judge and the judge who has the highest number of cases re-assigned from the selected judge in response to CCP § 170.6 filings (for example, Judge Doe and Judge Miller in FIG. 7). As another example, the two or more judges may include two or more judges who have the highest number of cases re-assigned from the selected judge in response to CCP § 170.6 filings (for example, top 3 judges in FIG. 7).

At block 808, the data visualization service 150 accesses analytics data associated with the two or more judges. The analytics data may include various performance metrics associated with the two or more judges, such as the likelihood of ruling on various types of motions for plaintiff, the likelihood of ruling on various types of motions for defendant, the number of actions taken with respect to the judges, and the analytics data may further indicate the case type associated with the motions and/or actions. Various combinations of filters (for example, case type, party, action type, and so forth) may be pre-applied to the analytics data stored in the analytics data repository 140 such that the latency associated with retrieval and processing of the specific analytics data requested by the user or the data visualization service 150 can be reduced.

At block 810, the data visualization service 150 generates instructions to display a UI element including the two or more judges. At block 812, the data visualization service 150 transmits the instructions to display the UI element to the user device, where the presented UI element includes a visual comparison of a plurality of metrics of the two or more judges. For example, the visual comparison may comprise a side-by-side comparison of each performance metric included in the UI element.

While FIG. 8 has been described above with reference to an embodiment in which the outcome visualizer 154 generates instructions to display a UI for user selection of a judge, receives the electronic indication that corresponds to the user selection of a judge, determines two or more judges, accesses analytics data associated with the two or more judges, and/or generates instructions to display a UI element including the two or more judges, in other embodiments, all or a portion of the method 800 may be performed by one of user devices 102 or another computing device not shown in FIG. 1. For example, executable code for performing one or more of generating instructions to display a UI for user selection of a judge, receiving the electronic indication that corresponds to the user selection of a judge, determining two or more judges, accessing analytics data associated with the two or more judges, and/or generating instructions to display a UI element including the two or more judges may be provided to a remote user computing device, which can execute the executable code to perform one or more of the steps of the method 800. Thus, in some embodiments, the data visualization process is performed entirely outside the data visualization and analytics system 101, In other embodiments, the data visualization process is performed partially by the data visualization and analytics system 101 and partially by one or more other computing systems. In some embodiments, one or more of the steps described with reference to FIG. 8 are performed using a SaaS platform.

Example User Interfaces Including Outcome Data Visual Indicators

Figure 9:
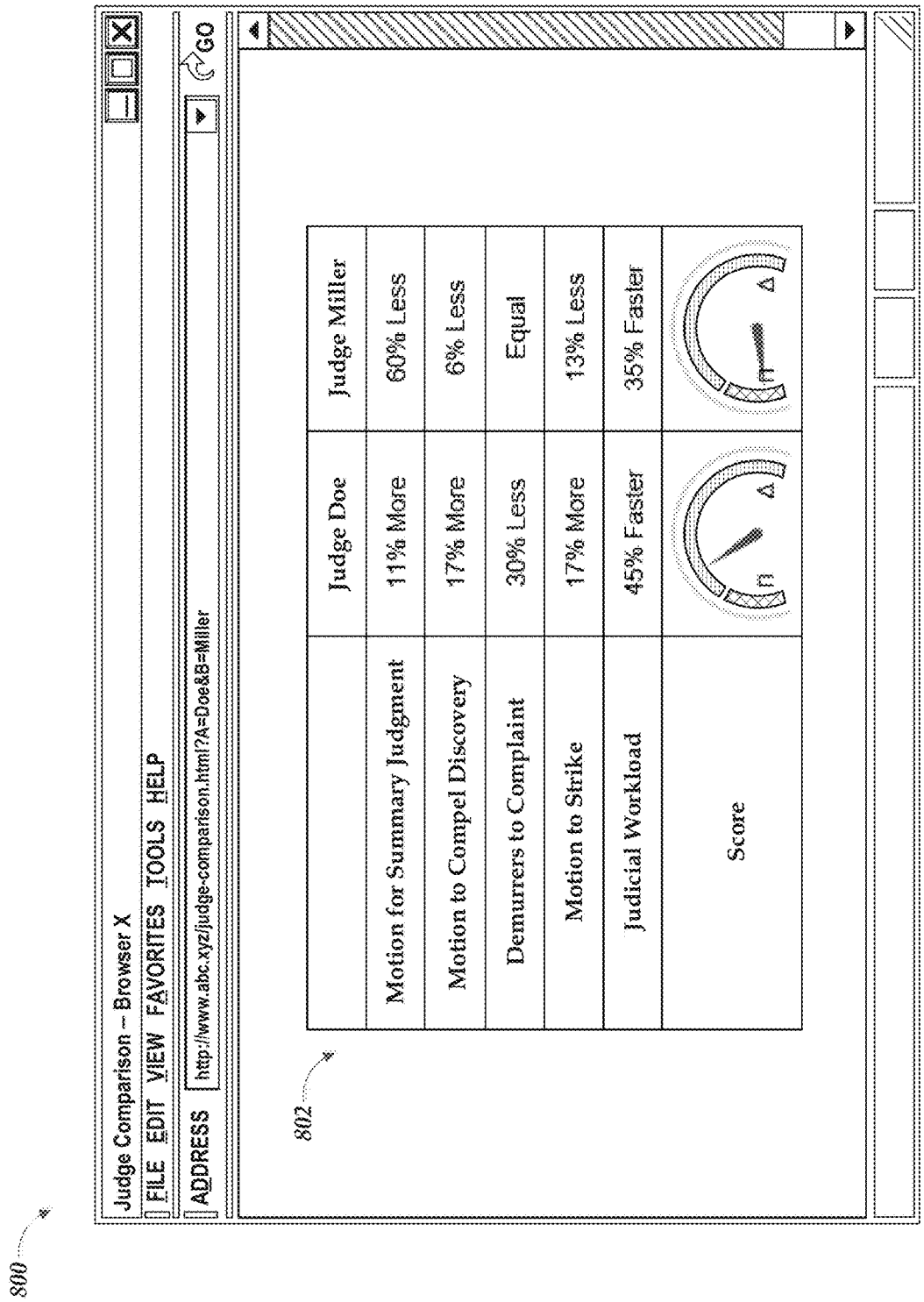
FIG. 9 is an embodiment of an example graphical user interface providing a visual comparison of two or more judges in accordance with aspects of the present disclosure.

FIG. 9 illustrates an embodiment of a user interface (UI) 900 displaying visual indicators for comparing the performance metrics of two or more judges. As shown in FIG. 9, the UI 900 includes a comparison chart 802 showing the performance metrics of Judge Doe and Judge Miller. In some cases, the performance metrics in the comparison chart 802 includes values relative to the average performance metric for all judges in the jurisdiction (for example, county, region, city, district, state, and so forth) (for example, 11% more likely to grant motions for summary judgement than the average judge in the county, 30% less likely to grant motions to compel discovery than the average judge in the county, and so forth). In other cases, the performance metrics in the comparison chart 802 includes absolute values (for example, 67% of all motions for summary judgment granted, 24% of all motion to compel discovery granted, and so forth), The comparison chart 802 includes a score metric indicative of how plaintiff-friendly or defendant-friendly the judge is. For example, in the bottom row of the comparison chart 802, the score for Judge Doe indicates that Judge Doe slightly favors defendants, and the score for Judge Miller indicates that Judge Miller heavily favors plaintiffs.

As shown in FIG. 9, the UI 900 can render visualization elements that reflect the generated analytics data indicating the desirability of taking a given action with respect to the selected judge (for example, Judge Doe) and make the desirability of taking the given action immediately apparent to the user viewing the UI 900 based on a visual comparison of the performance metrics of the selected judge and the performance metrics of another judge likely to take the case in the event of a CCP § 170.6 filing.

Figure 10:
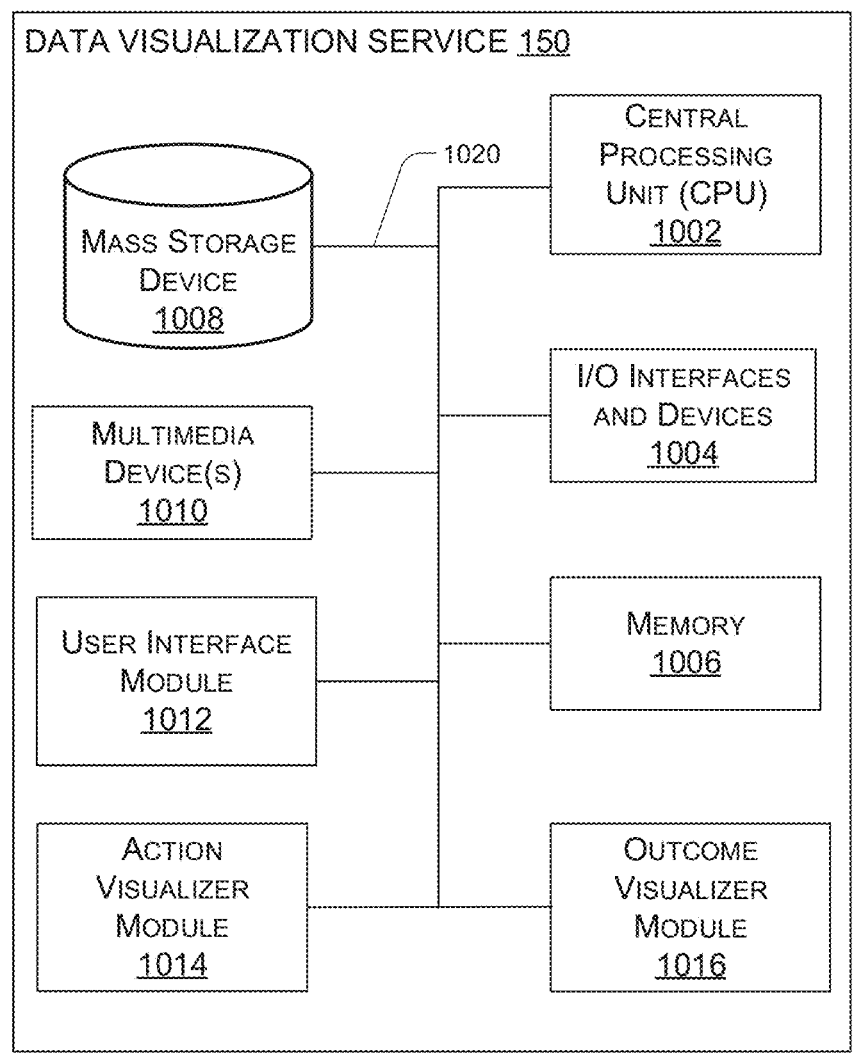
FIG. 10 is an embodiment of an example architecture of a computing device or system providing a data visualization service for visualizing data in accordance with aspects of the present disclosure.

Although not shown in FIG. 9, the comparison chart 802 may be generated in response to user activation of a UI element for generating a comparison chart between the selected judge (for example, Judge John Doe in FIG. 7) and one or more of the highest ranked judges in the outcome visualization (for example, Judge John Miller in FIG. 7). Although the comparison chart 802 includes two judges, additional judges may be included (for example, one or more of Judges Trask, Asberry, and so forth from FIG. 7), In some embodiments, the comparison chart 802 does not include the selected judge (for example, Judge Doe) and instead compares other judges (for example, Judges Miller against Judge Trask from FIG. 7). The UI 900 may include UI elements to assist a user to select one or more judges to include in the visual comparison. While the embodiment of the UI of FIG. 9 is shown with a browser, it is recognized that the UI could be displayed within other environments, for example, a mobile application or a stand-alone program Example Architecture of Data Visualization Service FIG. 10 is an embodiment of a block diagram corresponding to an aspect of a hardware and/or software component of an example embodiment of a data visualization service 150 in the data visualization and analytics system 101 of FIG. 1. One or more of the hardware and/or software components discussed below may be included in any of the devices of the data visualization and analytics system 101 (for example, the servers 120, data analytics service 130, the data visualization service 150, and so forth). These various depicted components may be used to implement the systems and methods described herein.

In some embodiments, certain modules described below, such as a user interface module 1012, an action visualizer module 1014, or an outcome visualizer module 1016 included with the data visualization service 150 may be included with, performed by, or distributed among different and/or multiple devices of the data visualization and analytics system 101. For example, certain graphical user interface functionality described herein may be performed by the user interface module 1012 of various devices such as the user device 102 and/or another computing device in the data visualization and analytics system 101.

In some embodiments, the various modules described herein may be implemented by either hardware or software. In an embodiment, various software modules included in the data visualization service 150 may be stored on a component of the data visualization service 150 itself (for example, a local memory 1006 or a mass storage device 1008), or on computer readable storage media or other component separate from the data visualization service 150 and in communication with the data visualization service 150 via the network 104 or other appropriate means.

The data visualization service 150 may comprise, for example, a computer that is IBM, Macintosh, or Linux/Unix compatible or a server or workstation or a mobile computing device operating on any corresponding operating system. In some embodiments, the data visualization service 150 interfaces with a smart phone, a personal digital assistant, a kiosk, a tablet, a smart watch, a car console, or a media player. In some embodiments, the data visualization service 150 may comprise more than one of these devices. In some embodiments, the data visualization service 150 includes one or more central processing units (CPUs or processors) 1002, I/O interfaces and devices 1004, memory 1006, a mass storage device 1008, a multimedia device 1010, the user interface module 1012, the action visualizer module 1014, the outcome visualizer module 1016, and a bus system 1020.

The CPU 1002 may control operation of the data visualization service 150. The CPU 1002 may also be referred to as a processor. The processor 1002 may comprise or be a component of a processing system implemented with one or more processors. The one or more processors may be implemented with any combination of general-purpose microprocessors, microcontrollers, digital signal processors (DSPs), field programmable gate arrays (FPGAs), programmable logic devices (PLDs), controllers, state machines, gated logic, discrete hardware components, dedicated hardware finite state machines, or any other suitable entities that can perform calculations or other manipulations of information.

The I/O interface 1004 may comprise a keypad, a microphone, a touchpad, a speaker, and/or a display, or any other commonly available input/output (I/O) devices and interfaces. The I/O interface 1004 may include any element or component that conveys information to the user of the data visualization service 150 and/or receives input from the user. In one embodiment, the I/O interface 1004 includes one or more display devices, such as a monitor, that allows the visual presentation of data to the user. More particularly, the display device provides for the presentation of UIs, application software data, websites, web apps, and multimedia presentations, for example.

In some embodiments, the I/O interface 1004 may provide a communication interface to various external devices. For example, the data visualization service 150 is electronically coupled to the network 104 (FIG. 1), which comprises one or more of a LAN, WAN, and/or the Internet. Accordingly, the I/O interface 1004 includes an interface allowing for communication with the network 104, for example, via a wired communication port, a wireless communication port, or combination thereof. The network 104 may allow various computing devices and/or other electronic devices to communicate with each other via wired or wireless communication links.

The memory 1006, which includes one or both of read-only memory (ROM) and random access memory (RAM), may provide instructions and data to the processor 1002. For example, data received via inputs received by one or more components of the data visualization service 150 may be stored in the memory 1006. A portion of the memory 1006 may also include non-volatile random access memory (NVRAM). The processor 1002 typically performs logical and arithmetic operations based on program instructions stored within the memory 1006. The instructions in the memory 1006 may be executable to implement the methods described herein. In some embodiments, the memory 1006 may be configured as a database and may store information that is received via the user interface module 1012 or the I/O interfaces and devices 1004.

The data visualization service 150 may also include the mass storage device 1008 for storing software or information (for example, the generated models or data obtained to which the models are applied, and so forth. Software shall be construed broadly to mean any type of instructions, whether referred to as software, firmware, middleware, microcode, hardware description language, or otherwise. Instructions may include code (for example, in source code format, binary code format, executable code format, or any other suitable format of code). The instructions, when executed by the one or more processors, cause the data visualization service 150 to perform the various functions described herein. Accordingly, the data visualization service 150 may include, for example, hardware, firmware, and software, or any combination therein. The mass storage device 1008 may comprise a hard drive, diskette, solid state drive, or optical media storage device. In some embodiments, the mass storage device 1008 may be structured such that the data stored therein is easily manipulated and parsed.

As shown in FIG. 10, the data visualization service 150 includes the action visualizer module 1014. As described herein, the action visualizer module 1014 may be configured to access data in the analytics data repository 140 and provide a visualization of the actions (for example, CCP § 170.6 filings) taken with respect to a particular judge. In some embodiments, the one or more visualizations generated by the action visualizer module 1014 may be stored in the mass storage device 1008 or the memory 1006. In some embodiments, the action visualizer module 1014 may be stored in the mass storage device 1008 or the memory 1006 as executable software code that is executed by the processor 1002. The action visualizer 1014 and other modules in the data visualization service 150, may include components, such as hardware and/or software components, object-oriented software components, class components and task components, processes, functions, attributes, procedures, subroutines, segments of program code, drivers, firmware, microcode, circuitry, data, databases, data structures, tables, arrays, and variables. In the embodiment shown in FIG. 10, the data visualization service 150 is configured to execute the action visualizer module 1014 to perform the various methods and/or processes as described herein.

The data visualization service 150 may also include the outcome visualizer module 1016. As described herein, the outcome visualizer module 1016 may be configured to access data in the analytics data repository 140 and provide a visualization of the outcomes of the actions (for example, CCP § 170.6 filings) taken with respect to a particular judge. In some embodiments, the one or more visualizations generated by the outcome visualizer module 1016 may be stored in the mass storage device 1008 or the memory 1006. In some embodiments, the outcome visualizer module 1016 may be stored in the mass storage device 1008 or the memory 1006 as executable software code that is executed by the processor 1002. The outcome visualizer module 1016 and other modules in the data visualization service 150, may include components, such as hardware and/or software components, object-oriented software components, class components and task components, processes, functions, attributes, procedures, subroutines, segments of program code, drivers, firmware, microcode, circuitry, data, databases, data structures, tables, arrays, and variables. In the embodiment shown in FIG. 10, the data visualization service 150 is configured to execute the outcome visualizer module 1016 to perform the various methods and/or processes as described herein.

The data visualization service 150 may also include the user interface module 1012. The user interface module 1012 may be configured to generate and/or operate user interfaces of various types. In some embodiments, the user interface module 1012 constructs pages, applications or displays to be displayed in a web browser or computer/mobile application. In some embodiments, the user interface module 1012 may provide an application or similar module for download and operation on the user device 102, through which the user may interface with the data visualization service 150 to obtain the desired visualization, report, or output. The pages or displays may, in some embodiments, be specific to a type of device, such as a mobile device or a desktop web browser, to maximize usability for the particular device. In some embodiments, the user interface module 1012 may also interact with a client-side application, such as a mobile phone application, a standalone desktop application, or user communication accounts (for example, e-mail, SMS messaging, and so forth) and provide data as necessary to display the visualizations described herein. In some embodiments, the user interface module 1012 may also be stored in the mass storage device 1008 as executable software code that is executed by the processor 1002. In the embodiment shown in FIG. 10, the data visualization service 150 may be configured to execute the user interface module 1012 to perform the various methods and/or processes as described herein.

The various components of the data visualization service 150 may be coupled together by the bus system 1020. The bus system 1020 may include a data bus, for example, as well as a power bus, a control signal bus, and a status signal bus in addition to the data bus. In different embodiments, the bus could be implemented in Peripheral Component Interconnect (PCI), Microchannel, Small Computer System Interface (SCSI), Industrial Standard Architecture (ISA) and Extended ISA (EISA) architectures, for example. In addition, the functionality provided for in the components and modules of the data visualization service 150 may be combined into fewer components and modules or further separated into additional components and modules than that shown in FIG. 10.

EXAMPLE EMBODIMENTS (EES)

EE 1: A data visualization platform system comprising: a data store configured to store analytics data associated with one or more data items; and a data visualization server comprising computer hardware and in communication with the data store, wherein the data visualization server is configured to: generate instructions to display a user interface (UI) on a remote user computing device, wherein the UI is configured to, when presented on the remote user computing device, include a first UI element for selecting a data item from among a plurality of data items; receive an electronic indication that a first selected data item of the plurality of data items has been selected in the first UI element presented on the remote user computing device, the first data item associated with a first data item category; access, from the data store, first analytics data associated with the first selected data item, the first analytics data indicating a first number of corresponding first category action data items associated to the first selected data item; access, from the data store, second analytics data associated with one or more additional data items of the plurality of data items, but excluding the selected data item, the one or more additional selected data items associated with the first data item category; determine a first feature type, a second feature type, and a date range to be used to generate instructions to present the first analytics data and the second analytics data on the remote user computing device; generate instructions to display a second UI element based on the first analytics data, the second analytics data, and the determined first feature type, second feature type, and date range, and the second UI element including (i) a first visual indicator corresponding to the first number of first category action data items associated with the first selected data item, and (ii) a second visual indicator corresponding to a second number of first category action data items based at least on the second analytics data associated with the one or more additional selected data items, such that the second UI element enables a visual comparison of the first number and the second number on the remote user computing device and renders a visual indication reflecting a weighing of the first category action data items as to the selected data item.

EE 2: The data visualization platform system of EE 1, wherein the data visualization server further causes the first visual indicator and the second visual indicator to be displayed adjacent to each other within a single display screen of the remote user computing device.

EE 3: The data visualization platform system of EE 1, wherein the data visualization server further causes the first visual indicator corresponding to the first selected data item and the second visual indicator to be displayed within a single display screen of the remote user computing device such that the second UI element includes at least one additional visual indicator corresponding to a second data item of the plurality of data items positioned between the first visual indicator and the second visual indicator.

EE 4: The data visualization platform system of EE 1, wherein the data visualization server further causes a third visual indicator to be displayed within a single display screen along with the first visual indicator and the second visual indicator, wherein the third visual indicator indicates a percentage value corresponding to a second data item of the plurality of data items.

EE 5: A system for providing data visualization, the system comprising: a data store configured to store analytics data associated with one or more judges; and a data visualization server comprising computer hardware and in communication with the data store, wherein the data visualization server is configured to: generate instructions to display a user interface (UI) for presentation on a remote user computing device, wherein the UI is configured to, when presented on the remote user computing device, include a first UI element for selecting a judge from a plurality of judges; receive an indication that a first judge of the plurality of judges has been selected in the first UI element presented on the remote user computing device, the first judge associated with a first geographical region; access, from the data store, first analytics data associated with the first judge, the first analytics data indicating a first number of reassignment motions submitted in cases assigned to the first judge; access, from the data store, second analytics data associated with one or more additional judges of the plurality of judges, the one or more additional judges associated with the first geographical region; determine a case type, a party type, and a date range to be used to present the first analytics data and the second analytics data on the remote user computing device; generate a second UI element based on the first analytics data, the second analytics data, and the determined case type, party type, and date range; and generate instructions to display the second UI on the remote user computing device, the second UI element including (i) a first visual indicator corresponding to the first number of reassignment motions submitted in the cases assigned to the first judge in the first geographical region and (ii) a second visual indicator corresponding to a second number of reassignment motions based at least on the second analytics data associated with the one or more additional judges in the first geographical region, such that the second UI element enables a visual comparison of the first number and the second number is enabled on the remote user computing device and renders a desirability of submitting a reassignment motion in a specific case assigned to the first judge immediately apparent to a user at the remote user computing device.

EE 6: The system of EE 5, wherein the data visualization server further causes the first visual indicator corresponding to the first judge and the second visual indicator to be displayed adjacent to each other within a single display screen of the remote user computing device.

EE 7: The system of EE 5, wherein the data visualization server further causes the first visual indicator corresponding to the first judge and the second visual indicator to be displayed within a single display screen of the remote user computing device such that the second UI element includes at least one additional visual indicator corresponding to a second judge of the plurality of judges positioned between the first visual indicator and the second visual indicator.

EE 8: The system of EE 5, wherein the data visualization server further causes a third visual indicator to be displayed within a single display screen along with the first visual indicator and the second visual indicator, wherein the third visual indicator indicates a percentage value corresponding to a second judge of the plurality of judges to whom a subset of the cases initially assigned to the first judge are transferred.

EE 9: A data visualization method, comprising: as implemented by one or more computing devices configured with specific executable instructions, receiving a request to generate a first user interface (UI) element for a first judge associated with a first geographical region; accessing, from a data store, first analytics data associated with the first judge, the analytics data indicating a number of reassignment motions submitted in cases assigned to the first judge; accessing, from the data store, second analytics data associated with one or more additional judges other than the first judge, the one or more additional judges associated with the first geographical region; determining one or more filters to be used to generate the first UI element for the first judge; generating the first UI element based on the first analytics data, the second analytics data, and the one or more determined filters; and generate instructions to display the first UI element on a remote user computing device, the first UI element including (i) a first visual indicator corresponding to the number of reassignment motions submitted in the cases assigned to the first judge in the first geographical region and (ii) a second visual indicator corresponding to a second number of reassignment motions based at least on the second analytics data associated with the one or more additional judges in the first geographical region.

EE 10: The data visualization method of EE 9, wherein the second number is an average number of reassignment motions submitted in the first geographical region.

EE 11: The data visualization method of EE 9, wherein the second number is a number of reassignment motions submitted in cases assigned to a second judge different from the first judge and associated with the first geographical region.

EE 12: The data visualization method of EE 9, further comprising causing the first visual indicator corresponding to the first judge and the second visual indicator to be displayed adjacent to each other within a single display screen of the remote user computing device.

EE 13: The data visualization method of EE 9, further comprising causing the first visual indicator corresponding to the first judge and the second visual indicator to be displayed within a single display screen of the remote user computing device such that the first UI element includes at least one additional visual indicator corresponding to a second judge different from the first judge and associated with the first geographical region, wherein said at least one additional visual indicator is positioned between the first visual indicator and the second visual indicator.

EE 14: The data visualization method of EE 9, further comprising causing a third visual indicator to be displayed within a single display screen along with the first visual indicator and the second visual indicator, wherein the third visual indicator indicates a percentage value corresponding to a second judge different from the first judge and associated with the first geographical region to whom a subset of the cases assigned to the first judge are transferred.

EE 15: The data visualization method of EE 9, further comprising generating, based at least on the first analytics data and the second analytics data, a second UI element including a visual comparison of one or more metrics between the first judge and a second judge identified in the first UI element, the second judge being different from the first judge and associated with the first geographical region.

EE 16: The data visualization method of EE 9, further comprising causing the first UI element to further include, when displayed on the remote user computing device, a plurality of additional visual indicators ordered by a number of reassignment motions submitted in the first geographical region indicated by each one of the plurality of additional visual indicators, such that the first visual indicator is positioned between two of the plurality of additional visual indicators.

EE 17: Non-transitory physical computer storage storing computer executable instructions that, when executed by one or more computing devices, configure the one or more computing devices to: receive a request to generate a user interface (UI) element for a first judge associated with a first geographical region; access, from a data store, first analytics data associated with the first judge, the analytics data indicating a number of reassignment motions submitted in cases assigned to the first judge; access, from the data store, second analytics data associated with one or more additional judges other than the first judge, the one or more additional judges associated with the first geographical region; determine one or more filters to be used to generate the UI element for the first judge; generate the UI element based on the first analytics data, the second analytics data, and the one or more determined filters; and generate instructions to display the UI element on a remote user computing device, the UI element including (i) a first visual indicator corresponding to the number of reassignment motions submitted in the cases assigned to the first judge in the first geographical region and (ii) a second visual indicator corresponding to a second number of reassignment motions based at least on the second analytics data associated with the one or more additional judges in the first geographical region.

EE 18: The non-transitory physical computer storage of EE 17, wherein the instructions, when executed by the one or more computing devices, further configure the one or more computing devices to search the data store for an entry associated with the first user entity text string, and search the data store for an entry associated with the second user entity text string.

EE 19: The non-transitory physical computer storage of EE 17, wherein the second number is one of (i) an average number of reassignment motions submitted in the first geographical region, or (ii) a number of reassignment motions submitted in cases assigned to a second judge different from the first judge and associated with the first geographical region.

EE 20: The non-transitory physical computer storage of EE 17, wherein the instructions, when executed by the one or more computing devices, further configure the one or more computing devices to cause the first visual indicator corresponding to the first judge and the second visual indicator to be displayed adjacent to each other within a single display screen of the remote user computing device.

EE 21: The non-transitory physical computer storage of EE 17, wherein the instructions, when executed by the one or more computing devices, further configure the one or more computing devices to cause the first visual indicator corresponding to the first judge and the second visual indicator to be displayed within a single display screen of the remote user computing device such that the first UI element includes at least one additional visual indicator corresponding to a second judge different from the first judge and associated with the first geographical region, wherein said at least one additional visual indicator is positioned between the first visual indicator and the second visual indicator.

EE 22: The non-transitory physical computer storage of EE 17, wherein the instructions, when executed by the one or more computing devices, further configure the one or more computing devices to cause a third visual indicator to be displayed within a single display screen along with the first visual indicator and the second visual indicator, wherein the third visual indicator indicates a percentage value corresponding to a second judge different from the first judge and associated with the first geographical region to whom a subset of the cases assigned to the first judge are transferred.

EE 23: The non-transitory physical computer storage of EE 17, wherein the instructions, when executed by the one or more computing devices, further configure the one or more computing devices to generate, based at least on the first analytics data and the second analytics data, a second UI element including a visual comparison of one or more metrics between the first judge and a second judge identified in the first UI element, the second judge being different from the first judge and associated with the first geographical region.

EE 24: The non-transitory physical computer storage of EE 17, wherein the instructions, when executed by the one or more computing devices, further configure the one or more computing devices to cause the first UI element to further include, when displayed on the remote user computing device, a plurality of additional visual indicators ordered by a number of reassignment motions submitted in the first geographical region indicated by each one of the plurality of additional visual indicators, such that the first visual indicator is positioned between two of the plurality of additional visual indicators.

Other Considerations

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm elements described in connection with the embodiments disclosed herein can be implemented as electronic hardware, computer software, or combinations of both. To clearly illustrate this interchangeability of hardware and software, various illustrative components, blocks, modules, and elements have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal. In some embodiments, at least some of the data described herein is stored in a blockchain format (as a blockchain ledger, for example) or in other decentralized storage systems.

Conditional language used herein, such as, among others, "can," "might," "may" "e.g.," and the like, unless specifically stated otherwise, or otherwise understood within the context as used, is generally intended to convey that certain embodiments include, while other embodiments do not include, certain features, elements, and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

Disjunctive language such as the phrase "at least one of X, Y, or Z," unless specifically stated otherwise, is otherwise understood with the context as used in general to present that an item, term, and so forth, may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a", "an", or "the" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions; and changes in the form and details of the devices or algorithms illustrated can be made without departing from the spirit of the disclosure. As will be recognized, certain embodiments described herein can be implemented within a form that does not provide all of the features and benefits set forth herein, as some features can be used or practiced separately from others. All such modifications and variations are intended to be included herein within the scope of this disclosure. Further, additional embodiments created by combining any two or more features or techniques of one or more embodiments described herein are also intended to be included herein within the scope of this disclosure.

What is claimed is:

1. A data visualization platform system comprising:
a data store configured to store analytics data associated with one or more judicial entities; and
a data visualization server comprising computer hardware and in communication with the data store, wherein the data visualization server is configured to:
generate instructions to display a user interface (UI) on a remote user computing device, wherein the UI is configured to, when presented on the remote user computing device, include a first UI element for selecting a judicial entity from a plurality of judicial entities;
receive an electronic indication that a first judicial entity of the plurality of judicial entities has been selected in the first UI element presented on the remote user computing device;
determine that the first judicial entity is associated with a first geographical region;
access, from the data store, first analytics data associated with the first judicial entity, the first analytics data indicating a number or frequency of reassignment motions submitted in cases assigned to the first judicial entity;
determine, based on the first judicial entity selected in the first UI element presented on the remote user computing device, one or more additional judicial entities to be compared with the first judicial entity, wherein each one of the one or more additional judicial entities is associated with the first geographical region, and wherein the one or more additional judicial entities include one of the plurality of judicial entities having a highest number or frequency of cases reassigned from the first judicial entity among the plurality of judicial entities as a result of the reassignment motions submitted in the cases assigned to the first judicial entity;
access, from the data store, second analytics data associated with the one or more additional judicial entities, wherein the second analytics data include one or more performance metrics associated with the one or more additional judicial entities;
determine one or more filter values and a date range to be used to generate instructions to present the first analytics data and the second analytics data on the remote user computing device;
generate instructions to display a second UI element based on the first analytics data, the second analytics data, the one or more filter values, and the date range, and the second UI element including
(i) a first visual indicator corresponding to a first aggregate number or frequency of reassignment motions based on aggregating the first analytics data associated with the first judicial entity over the determined date range, and (ii) a second visual indicator corresponding to a second aggregate number or frequency of reassignment motions based on aggregating at least the second analytics data associated with the one or more additional judicial entities associated with the first geographical region over the determined date range, such that the second UI element enables a visual comparison of the first aggregate number or frequency against the second aggregate number or frequency on the remote user computing device and renders a relative number or frequency of reassignment motions submitted in cases assigned to the first judicial entity immediately apparent to a user at the remote user computing device.

2. The data visualization platform system of claim 1, wherein the data visualization server is further configured to cause the first visual indicator and the second visual indicator to be displayed adjacent to each other within a single display screen of the remote user computing device.

3. The data visualization platform system of claim 1, wherein the data visualization server is further configured to cause the first visual indicator corresponding to the first judicial entity and the second visual indicator to be displayed within a single display screen of the remote user computing device such that the second UI element includes at least one additional visual indicator corresponding to a second judicial entity of the plurality of judicial entities positioned between the first visual indicator and the second visual indicator.

4. The data visualization platform system of claim 1, wherein the data visualization server is further configured to cause a third visual indicator to be displayed within a single display screen along with the first visual indicator and the second visual indicator, wherein the third visual indicator indicates a percentage value corresponding to a second judicial entity of the plurality of judicial entities to which a subset of the cases initially assigned to the first judicial entity are transferred.

5. The data visualization platform system of claim 1, wherein the second aggregate number or frequency is an average number of reassignment motions submitted in the first geographical region.

6. The data visualization platform system of claim 1, wherein the second aggregate number or frequency is a number of reassignment motions submitted in cases assigned to a second judicial entity different from the first judicial entity and associated with the first geographical region.

7. The data visualization platform system of claim 1, wherein the data visualization server is further configured to generate, based at least on the first analytics data and the second analytics data, a third UI element including a visual comparison of one or more metrics between the first judicial entity and a second judicial entity identified in the second UI element, the second judicial entity being different from the first judicial entity and associated with the first geographical region.

8. The data visualization platform system of claim 1, wherein the data visualization server is further configured to cause the second UI element to further include, when displayed on the remote user computing device, a plurality of additional visual indicators ordered by a number or frequency of reassignment motions submitted in the first geographical region indicated by each one of the plurality of additional visual indicators, such that the first visual indicator is positioned between two of the plurality of additional visual indicators.

9. The data visualization platform system of claim 1, wherein the reassignment motions submitted in the cases assigned to the first judicial entity include one or more of: reassignment requests, reassignment filings, reassignment actions, or reassignment submissions; and wherein the first geographical region includes one or more of: counties, regions, cities, districts, states, or jurisdictions.

10. A data visualization method, comprising:

as implemented by one or more computing devices configured with specific executable instructions, receiving a request to generate a first user interface (UI) element for a first judicial entity associated with a first geographical region;

accessing, from a data store, first analytics data associated with the first judicial entity, the first analytics data indicating a number or frequency of reassignment motions submitted in cases assigned to the first judicial entity;

determining, based on the first judicial entity, one or more additional judicial entities to be compared with the first judicial entity, wherein each one of the one or more additional judicial entities is associated with the first geographical region, and wherein the one or more additional judicial entities include one of a plurality of judicial entities having a highest number or frequency of cases reassigned from the first judicial entity among the plurality of judicial entities as a result of the reassignment motions in the cases assigned to the first judicial entity;

accessing, from the data store, second analytics data associated with the one or more additional judicial entities, wherein the second analytics data include one or more performance metrics associated with the one or more additional judicial entities;

determining one or more filter values and a date range to be used to generate the first UI element for the first judicial entity;

generating the first UI element based on the first analytics data, the second analytics data, and the one or more determined filter values and date range; and generating instructions to display the first UI element on a remote user computing device, the first UI element including (i) a first visual indicator corresponding to a first aggregate number or frequency of reassignment motions based on aggregating the first analytics data associated with the first judicial entity over the determined date range, and (ii) a second visual indicator corresponding to a second aggregate number or frequency of reassignment motions based on aggregating at least the second analytics data associated with the one or more additional judicial entities associated with the first geographical region over the determined date range, such that the first UI element enables a visual comparison of the first aggregate number or frequency against the second aggregate number or frequency on the remote user computing device and renders a relative number or frequency of reassignment motions submitted in cases assigned to the first judicial entity immediately apparent to a user at the remote user computing device.

29

11. The data visualization method of claim 10, wherein the second aggregate number or frequency is an average number of reassignment motions submitted in the first geographical region.

12. The data visualization method of claim 10, wherein the second aggregate number or frequency is a number of reassignment motions submitted in cases assigned to a second judicial entity different from the first judicial entity and associated with the first geographical region.

13. The data visualization method of claim 10, further comprising causing the first visual indicator corresponding to the first judicial entity and the second visual indicator to be displayed adjacent to each other within a single display screen of the remote user computing device.

14. The data visualization method of claim 10, further comprising causing the first visual indicator corresponding to the first judicial entity and the second visual indicator to be displayed within a single display screen of the remote user computing device such that the first UI element includes at least one additional visual indicator corresponding to a second judicial entity different from the first judicial entity and associated with the first geographical region, wherein said at least one additional visual indicator is positioned between the first visual indicator and the second visual indicator.

15. The data visualization method of claim 10, further comprising causing a third visual indicator to be displayed within a single display screen along with the first visual indicator and the second visual indicator, wherein the third visual indicator indicates a percentage value corresponding to a second judicial entity different from the first judicial entity and associated with the first geographical region to which a subset of the cases assigned to the first judicial entity are transferred.

16. The data visualization method of claim 10, further comprising generating, based at least on the first analytics data and the second analytics data, a second UI element including a visual comparison of one or more metrics between the first judicial entity and a second judicial entity identified in the first UI element, the second judicial entity being different from the first judicial entity and associated with the first geographical region.

17. The data visualization method of claim 10, further comprising causing the first UI element to further include, when displayed on the remote user computing device, a plurality of additional visual indicators ordered by a number or frequency of reassignment motions submitted in the first geographical region indicated by each one of the plurality of additional visual indicators, such that the first visual indicator is positioned between two of the plurality of additional visual indicators.

18. The data visualization method of claim 10, wherein the reassignment motions submitted in the cases assigned to the first judicial entity include one or more of: reassignment requests, reassignment filings, reassignment actions, or reassignment submissions; and wherein the first geographical region includes one or more of: counties, regions, cities, districts, states, or jurisdictions.

19. Non-transitory physical computer storage storing computer executable instructions that, when executed by one or more computing devices, configure the one or more computing devices to:
receive a request to generate a first user interface (UI) element for a first judicial entity associated with a first geographical region;
access, from a data store, first analytics data associated with the first judicial entity, the first analytics data

30 indicating a number or frequency of reassignment motions submitted in cases assigned to the first judicial entity;
determine, based on the first judicial entity, one or more additional judicial entities to be compared with the first judicial entity, wherein each one of the one or more additional judicial entities is associated with the first geographical region, and wherein the one or more additional judicial entities include one of a plurality of judicial entities having a highest number or frequency of cases reassigned from the first judicial entity among the plurality of judicial entities as a result of the reassignment motions submitted in the cases assigned to the first judicial entity;
access, from the data store, second analytics data associated with one or more additional judicial entities, wherein the second analytics data include one or more performance metrics associated with the one or more additional judicial entities;
determine one or more filter values and a date range to be used to generate the first UI element for the first judicial entity;
generate the first UI element based on the first analytics data, the second analytics data, and the one or more determined filter values and date range; and
generate instructions to display the first UI element on a remote user computing device, the first UI element including
(i) a first visual indicator corresponding to a first aggregate number or frequency of reassignment motions based on aggregating the first analytics data associated with the first judicial entity over the determined date range, and
(ii) a second visual indicator corresponding to a second aggregate number or frequency of reassignment motions based on aggregating at least the second analytics data associated with the one or more additional judicial entities associated with the first geographical region over the determined date range,
such that the first UI element enables a visual comparison of the first aggregate number or frequency against the second aggregate number or frequency on the remote user computing device and renders a relative number or frequency of reassignment motions submitted in cases assigned to the first judicial entity immediately apparent to a user at the remote user computing device.

20. The non-transitory physical computer storage of claim 19, wherein the second aggregate number or frequency is an average number of reassignment motions submitted in the first geographical region.

21. The non-transitory physical computer storage of claim 19, wherein the instructions, when executed by the one or more computing devices, further configure the one or more computing devices to cause the first visual indicator corresponding to the first judicial entity and the second visual indicator to be displayed adjacent to each other within a single display screen of the remote user computing device.

22. The non-transitory physical computer storage of claim 19, wherein the instructions, when executed by the one or more computing devices, further configure the one or more computing devices to cause the first visual indicator corresponding to the first judicial entity and the second visual indicator to be displayed within a single display screen of the remote user computing device such that the first UI element includes at least one additional visual indicator corresponding to a second judicial entity different from the first judicial entity and associated with the first geographical region, wherein said at least one additional visual indicator is positioned between the first visual indicator and the second visual indicator.

23. The non-transitory physical computer storage of claim 19, wherein the instructions, when executed by the one or more computing devices, further configure the one or more computing devices to cause a third visual indicator to be displayed within a single display screen along with the first visual indicator and the second visual indicator, wherein the third visual indicator indicates a percentage value corresponding to a second judicial entity different from the first judicial entity and associated with the first geographical region to which a subset of the cases assigned to the first judicial entity are transferred.

24. The non-transitory physical computer storage of claim 19, wherein the instructions, when executed by the one or more computing devices, further configure the one or more computing devices to generate, based at least on the first analytics data and the second analytics data, a second UI element including a visual comparison of one or more metrics between the first judicial entity and a second judicial entity identified in the first UI element, the second judicial entity being different from the first judicial entity and associated with the first geographical region.

25. The non-transitory physical computer storage of claim 19, wherein the instructions, when executed by the one or more computing devices, further configure the one or more computing devices to cause the first UI element to further include, when displayed on the remote user computing device, a plurality of additional visual indicators ordered by a number of reassignment motions submitted in the first geographical region indicated by each one of the plurality of additional visual indicators, such that the first visual indicator is positioned between two of the plurality of additional visual indicators.

26. The non-transitory physical computer storage of claim 19, wherein the second aggregate number or frequency is a number of reassignment motions submitted in cases assigned to a second judicial entity different from the first judicial entity and associated with the first geographical region.

27. The non-transitory physical computer storage of claim 19, wherein the reassignment motions submitted in the cases assigned to the first judicial entity include one or more of: reassignment requests, reassignment filings, reassignment actions, or reassignment submissions; and wherein the first geographical region includes one or more of: counties, regions, cities, districts, states, or jurisdictions.

* * * * *